(12) United States Patent
Rekow et al.

(10) Patent No.: US 10,655,710 B2
(45) Date of Patent: May 19, 2020

(54) MULTI-MODE INFINITELY VARIABLE TRANSMISSION THAT PROVIDES SEAMLESS SHIFTING

(71) Applicant: Deere & Company, Moline, IL (US)

(72) Inventors: Andrew K. Rekow, Cedar Falls, IA (US); Rainer Gugel, Plankstadt (DE); David Mueller, Stutensee (DE); Thomas G. Ore, Cedar Falls, IA (US); Dennis L. Jeffries, Underwood, MN (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/628,979

(22) Filed: Jun. 21, 2017

(65) Prior Publication Data

US 2017/0284517 A1    Oct. 5, 2017

Related U.S. Application Data

(63) Continuation-in-part of application No. 15/384,533, filed on Dec. 20, 2016, now Pat. No. 10,119,598, (Continued)

(51) Int. Cl.
*F16H 3/72*     (2006.01)
*F16H 37/08*    (2006.01)
(Continued)

(52) U.S. Cl.
CPC ............. *F16H 3/728* (2013.01); *B60K 6/12* (2013.01); *B60K 6/365* (2013.01); *B60K 6/42* (2013.01);
(Continued)

(58) Field of Classification Search
CPC ............... F16H 3/728; F16H 37/084; F16H 2061/0012; F16H 2003/007;
(Continued)

(56) References Cited

U.S. PATENT DOCUMENTS 3,214,987 A   11/1965   Schenck et al.
3,626,787 A   12/1971   Singer
(Continued)

FOREIGN PATENT DOCUMENTS

AT       11545 U1    12/2010
CN     101255907 A    9/2008
(Continued)

OTHER PUBLICATIONS

USPTO, Office Action in U.S. Appl. No. 14/536,097 dated Sep. 25, 2017 (22 pages).
(Continued)

*Primary Examiner* — Mark J Beauchaine
(74) *Attorney, Agent, or Firm* — Klintworth & Rozenblat IP LLP

(57) ABSTRACT

An infinitely variable transmission (IVT) provides a plurality of transmission modes. At least one mode is a serial mode and at least one other mode is a split-path mode. The IVT provides substantially seamless shifting between the plurality of transmission modes.

16 Claims, 21 Drawing Sheets

Related U.S. Application Data which is a continuation-in-part of application No. 14/536,097, filed on Nov. 7, 2014, now Pat. No. 9,981,665, which is a continuation-in-part of application No. 14/145,599, filed on Dec. 31, 2013, now Pat. No. 9,206,885.

(51) Int. Cl.

| | | |
|---|---|---|
| *B60W 20/20* | (2016.01) | |
| *F16H 61/66* | (2006.01) | |
| *B60W 10/103* | (2012.01) | |
| *B60W 10/101* | (2012.01) | |
| *B60K 6/365* | (2007.10) | |
| *B60K 6/445* | (2007.10) | |
| *B60W 10/08* | (2006.01) | |
| *B60W 10/105* | (2012.01) | |
| *B60W 30/19* | (2012.01) | |
| *B60K 6/12* | (2006.01) | |
| *B60W 10/06* | (2006.01) | |
| *B60W 30/18* | (2012.01) | |
| *B60K 6/42* | (2007.10) | |
| *F16H 61/00* | (2006.01) | |
| *B60W 20/40* | (2016.01) | |
| *F16H 47/04* | (2006.01) | |

(52) U.S. Cl.
CPC ............ *B60K 6/445* (2013.01); *B60W 10/06* (2013.01); *B60W 10/08* (2013.01); *B60W 10/101* (2013.01); *B60W 10/103* (2013.01); *B60W 10/105* (2013.01); *B60W 20/20* (2013.01); *B60W 30/18063* (2013.01); *B60W 30/19* (2013.01); *F16H 37/084* (2013.01); *F16H 61/66* (2013.01); *B60W 20/40* (2013.01); *F16H 47/04* (2013.01); *F16H 2037/0866* (2013.01); *F16H 2061/0012* (2013.01); *F16H 2061/6602* (2013.01); *F16H 2702/02* (2013.01); *Y10S 903/93* (2013.01); *Y10T 477/27* (2015.01)

(58) Field of Classification Search
CPC ........ F16H 61/0403; F16H 2061/0422; B60W 20/20; B60W 20/40; Y10S 903/911
See application file for complete search history.

(56) References Cited

U.S. PATENT DOCUMENTS

| | | | |
|---|---|---|---|
| 3,651,904 | A | 3/1972 | Snoy et al. |
| 3,714,845 | A | 2/1973 | Mooney, Jr. |
| 3,783,711 | A | 1/1974 | Orshansky, Jr. |
| 4,090,414 | A | 5/1978 | White |
| 4,164,155 | A | 8/1979 | Reed et al. |
| 4,164,156 | A | 8/1979 | Reed |
| 5,353,662 | A | 10/1994 | Vaughters |
| 5,508,574 | A | 4/1996 | Vlock |
| 5,931,757 | A | 8/1999 | Schmidt |
| 6,478,705 | B1 | 11/2002 | Holmes et al. |
| 6,684,148 | B2 | 1/2004 | Chess |
| 7,008,342 | B2 | 3/2006 | Dyck et al. |
| 7,252,611 | B2 | 8/2007 | Raghavan et al. |
| 7,294,079 | B2 | 11/2007 | Raghavan et al. |
| 7,311,627 | B2 | 12/2007 | Tarasinski |
| 7,329,201 | B2 | 2/2008 | Raghavan et al. |
| 7,367,911 | B2 | 5/2008 | Raghavan et al. |
| 7,377,876 | B2 | 5/2008 | Yang |
| 7,399,246 | B2 | 7/2008 | Holmes et al. |
| 7,465,251 | B2 | 12/2008 | Zhang |
| 7,473,201 | B2 | 1/2009 | Raghavan |
| 7,479,081 | B2 | 1/2009 | Holmes |
| 7,491,144 | B2 | 2/2009 | Conlon |
| 7,901,314 | B2 | 3/2011 | Salvaire et al. |
| 7,942,776 | B2 | 5/2011 | Conlon |
| 8,234,956 | B2 | 8/2012 | Love et al. |
| 8,257,213 | B2 | 9/2012 | Komada et al. |
| 8,469,127 | B2 | 6/2013 | Tarasinski et al. |
| 8,500,585 | B2 | 8/2013 | Kim et al. |
| 8,573,340 | B2 | 11/2013 | Tarasinski et al. |
| 8,579,751 | B2 | 11/2013 | Phillips |
| 8,596,157 | B2 | 12/2013 | Vu |
| 8,660,724 | B2 | 2/2014 | Tarasinski et al. |
| 8,734,281 | B2 | 5/2014 | Ai et al. |
| 8,747,266 | B2 | 6/2014 | Aitzetmueller et al. |
| 8,784,246 | B2 | 7/2014 | Treichel et al. |
| 8,790,202 | B2 | 7/2014 | Sakai et al. |
| 8,944,194 | B2 | 2/2015 | Glaser et al. |
| 8,986,162 | B2 | 3/2015 | Dix et al. |
| 9,002,560 | B2 | 4/2015 | Hasegawa |
| 9,206,885 | B2 | 12/2015 | Rekow et al. |
| 9,487,073 | B2 | 11/2016 | Love et al. |
| 9,562,592 | B2 | 2/2017 | Rekow et al. |
| 9,944,163 | B2 | 4/2018 | McKinzie |
| 9,981,665 | B2 | 5/2018 | Rekow et al. |
| 10,119,598 | B2 | 11/2018 | Rekow et al. |
| 2003/0186769 | A1* | 10/2003 | Ai .......... B60K 6/365 475/5 |
| 2004/0094381 | A1 | 5/2004 | Versteyhe |
| 2005/0049100 | A1 | 3/2005 | Ai et al. |
| 2006/0046886 | A1 | 3/2006 | Holmes et al. |
| 2006/0111212 | A9* | 5/2006 | Ai .......... B60K 6/365 475/5 |
| 2006/0142104 | A1* | 6/2006 | Saller ........ B60K 6/365 475/5 |
| 2006/0276291 | A1* | 12/2006 | Fabry ........ F16H 47/04 475/72 |
| 2007/0021256 | A1 | 1/2007 | Klemen et al. |
| 2007/0021257 | A1 | 1/2007 | Klemen et al. |
| 2007/0249455 | A1 | 10/2007 | Hasegawa et al. |
| 2010/0048338 | A1 | 2/2010 | Si |
| 2010/0179009 | A1 | 7/2010 | Wittkopp et al. |
| 2010/0261565 | A1 | 10/2010 | Ai et al. |
| 2011/0130235 | A1 | 6/2011 | Phillips |
| 2012/0157254 | A1 | 6/2012 | Aitzetmueller et al. |
| 2013/0023370 | A1 | 1/2013 | Grad et al. |
| 2014/0018201 | A1 | 1/2014 | Tolksdorf |
| 2014/0128196 | A1 | 5/2014 | Rintoo |
| 2015/0006007 | A1 | 1/2015 | Kitahata et al. |
| 2015/0072823 | A1 | 3/2015 | Rintoo |
| 2015/0142232 | A1 | 5/2015 | Tabata et al. |
| 2015/0183436 | A1 | 7/2015 | Rekow et al. |
| 2015/0184726 | A1 | 7/2015 | Rekow et al. |
| 2015/0292608 | A1 | 10/2015 | McKinzie |
| 2016/0090091 | A1 | 3/2016 | Gugel et al. |
| 2016/0201295 | A1 | 7/2016 | Kishimoto et al. |
| 2016/0272059 | A1 | 9/2016 | Watanabe et al. |
| 2017/0102059 | A1 | 4/2017 | Rekow et al. |
| 2017/0284508 | A1 | 10/2017 | Devreese |
| 2017/0328453 | A1 | 11/2017 | McKinzie et al. |
| 2018/0043764 | A1 | 2/2018 | McKinzie et al. |
| 2018/0149247 | A1 | 5/2018 | Rekow et al. |
| 2018/0298993 | A1 | 10/2018 | Fliearman et al. |

FOREIGN PATENT DOCUMENTS

| | | |
|---|---|---|
| CN | 102844588 A | 12/2012 |
| DE | 1173348 B | 7/1964 |
| DE | 4010919 A1 | 10/1991 |
| DE | 19621200 A1 | 11/1997 |
| DE | 19954636 A1 | 5/2001 |
| DE | 10128076 A1 | 12/2002 |
| DE | 112006002537 T5 | 9/2008 |
| DE | 202009007972 U1 | 6/2010 |
| DE | 102010021846 A1 | 12/2011 |
| DE | 10201102210 A1 | 7/2012 |
| DE | 102011102184 A1 | 7/2012 |
| DE | 10201105868 A1 | 1/2013 |
| DE | 102011115002 A1 | 4/2013 |
| DE | 102013220167 A1 | 4/2015 |
| DE | 202015102282 U1 | 6/2015 |

(56) References Cited

FOREIGN PATENT DOCUMENTS

| | | |
|---|---|---|
| DE | 19214225298 A1 | 7/2015 |
| DE | 102015200973 A1 | 7/2016 |
| DE | 102016120965 A1 | 5/2017 |
| DE | 102016204727 A1 | 9/2017 |
| DE | 102006041160 A1 | 9/2018 |
| DE | 102018108510 A1 | 10/2018 |
| EP | 805059 A2 | 5/1997 |
| EP | 1099882 A2 | 5/2001 |
| EP | 1707416 B1 | 8/2007 |
| EP | 2466168 | 6/2012 |
| EP | 2466169 | 6/2012 |
| WO | 2011092643 A1 | 8/2011 |
| WO | 2012171812 | 12/2012 |

OTHER PUBLICATIONS

Extended German Search Report for application No. 102018209940.5 dated Feb. 28, 2019. (10 pages).
German Search Report for application No. 102019205211 dated Sep. 5, 2019 (12 pages).
Deere & Company, U.S. Appl. No. 15/879,796, filed Jan. 25, 2018.
Deere & Company, U.S. Appl. No. 15/971,867, filed May 4, 2018.
Deere & Company, U.S. Appl. No. 15/977,242, filed May 11, 2018.
Deere & Company, U.S. Appl. No. 16/371,598, filed Apr. 1, 2019.
German Search Report for application No. 1020182036705 dated Jul. 16, 2015.
German Search Report for application No. 1020182036705 dated Dec. 20, 2018.
German Search Report for application No. 102018210616 dated Feb. 1, 2019.
German Search Report for application No. 1020182099391 dated Feb. 27, 2019.
German Search Report for application No. 102018212712 dated Apr. 12, 2019.
CNIPA Office Action for Application No. 201510165982A dated Aug. 9, 2018, Serial Notice No. 2018080601675890.
USPTO, Office Action in U.S. Appl. No. 15/664,289 dated Jul. 26, 2018.
USPTO, Office Action in U.S. Appl. No. 14/249,258 dated Apr. 21, 2017.
USPTO, Office Action in U.S. Appl. No. 15/664,289 dated Dec. 13, 2018.
USPTO, Office Action in U.S. Appl. No. 14/249,258 dated Oct. 17, 2016.
USPTO, Office Action in U.S. Appl. No. 14/249,258 dated Aug. 22, 2017.
USPTO, Office Action in U.S. Appl. No. 15/485,911 dated Feb. 8, 2019.
USPTO, Office Action in U.S. Appl. No. 15/793,522 dated Apr. 18, 2019.
USPTO, Office Action in U.S. Appl. No. 15/879,796 dated Aug. 23, 2019.
Schmetz, Roland, Electromechanische Traktorgetriebe Getriebe mit Zukunft, Electromechanical Tractor Units—Gearboxes with a Future, Landtechnik, Agricultural Engineering, vol. 54; Issue 2; pp. 72-73, Feb. 1999.
John M. Miller, Hybrid Electric Vehicle Propulsion System Architectures of the e-CVT Type, IEEE Transactions on Power Electronics, vol. 21, No. 3, May 2006.
Jian Dong, Zuomin Dong, Curran Crawford, Review of Continuously Variable Transmission Powertrain System for Hybrid Electric Vehicles, Proceedings of the ASME 2011 International Mechanical Engineering Congress & Exposition, IMECE2011-63321, Nov. 11-17, 2011.
USPTO, Non-Final Office Action issued in pending U.S. Appl. No. 15/971,867 dated Dec. 12, 2019.
German Search Report for application No. 102019204706.8 dated Dec. 17, 2019.

\* cited by examiner

MULTI-MODE INFINITELY VARIABLE TRANSMISSION THAT PROVIDES SEAMLESS SHIFTING

CROSS-REFERENCE TO RELATED APPLICATIONS

This application is a continuation-in-part of U.S. application Ser. No. 15/384,533, filed Dec. 20, 2016, which is a continuation-in-part of U.S. application Ser. No. 14/536,097, filed Nov. 7, 2014, which is a continuation-in-part of U.S. application Ser. No. 14/145,599, filed on Dec. 31, 2013, and issued as U.S. Pat. No. 9,206,885 on Dec. 8, 2015, the entire disclosure of each being incorporated by reference herein.

STATEMENT OF FEDERALLY SPONSORED RESEARCH OR DEVELOPMENT

Not applicable.

FIELD OF THE DISCLOSURE

This disclosure relates to infinitely variable transmissions and, more particularly, to an infinitely variable transmission with a plurality of different powered modes.

BACKGROUND OF THE DISCLOSURE

It may be useful, in a variety of settings, to utilize both a traditional engine (e.g., an internal combustion engine) and an infinitely variable power source (e.g., an electric or hydrostatic motor, a variable chain drive, and so on) to provide useful power. For example, a portion of engine power may be diverted to drive a first infinitely variable machine (e.g., a first electric machine acting as a generator), which may in turn drive a second infinitely variable machine (e.g., a second electric machine acting as a motor using electrical power from the first electrical machine). In certain configurations, power from both types of sources (i.e., an engine and an infinitely variable power source) may be combined for final power delivery (e.g., to a vehicle axle) via an infinitely variable transmission ("IVT") or continuously variable transmission ("CVT"). This may be referred to as "split-mode" or "split-path mode" operation because power transmission may be split between the mechanical path from the engine and the infinitely variable path. Split-mode operation may be attained in various known ways. For example, a planetary gear set may be utilized to sum rotational power from an engine and from an electric machine, with the summed power transmitted downstream within an associated powertrain. This may allow for delivery of power (e.g., to vehicle wheels) with an infinitely variable effective gear ratio. Various issues may arise, however, including limitations relating to the maximum practical speed of variable power sources.

The operation of other types of transmissions, as well as IVT or CVT transmissions, may introduce various other issues. For example, in certain configurations, transmission shifts (e.g., transitions between different gear ratios) may result in jolts to a vehicle, lags or other transient effects on available power (e.g., at the wheels of a vehicle or at an attached tool or implement), or other detrimental effects on system performance and user experience.

SUMMARY OF THE DISCLOSURE

In one aspect, the disclosure provides a work vehicle that includes an engine, at least one infinitely variable power source (IVP), and an output shaft. The work vehicle also includes an infinitely variable transmission (IVT) that includes a variator. The IVT is configured to shift between a plurality of transmission modes. The IVT is configured to transmit power from at least one of the engine and the IVP to the output shaft in the plurality of transmission modes. The plurality of transmission modes includes at least one serial mode and at least one split-path mode. In the serial mode, the variator receives engine power from the engine and IVP power from the at least one IVP, and the variator outputs recombined power from the IVP. In the split-path mode, the variator receives engine power from the engine and IVP power from the at least one IVP, and the variator outputs combined power from the IVP and the engine. The IVT includes an engageable transmission member that is configured to move between an engaged position and a disengaged position. The engageable transmission member includes a first component and a second component. The first and second components are rotatably engaged in the engaged position, and the first and second components are disengaged in the disengaged position. The plurality of transmission modes includes a first mode and a second mode. The IVT is configured to shift from the first mode to the second mode, at least in part, by moving the engageable transmission member from the disengaged position to the engaged position. The first and second components are configured to rotate at approximately the same angular speed as the engageable transmission member moves from the disengaged position to the engaged position.

In another aspect, a method is disclosed for operating an infinitely variable transmission (IVT) for transferring power from an engine and at least one infinitely variable power source (IVP) to an output shaft. The method includes operating the IVT in a serial mode in which a variator of the IVT receives engine power from the engine and IVP power from the at least one IVP, and the variator outputs recombined power from the IVP. The method also includes operating the IVT in a split-path mode in which the variator receives engine power from the engine and IVP power from the at least one IVP, and the variator outputs combined power from the IVP and the engine. Furthermore, the method includes shifting from a first mode to a second mode of the plurality of transmission modes of the IVT. Shifting from the first mode to the second mode includes moving an engageable transmission member from a disengaged position to an engaged position. The engageable transmission member includes a first component and a second component. The first and second components are rotatably engaged in the engaged position, and the first and second components are disengaged in the disengaged position. Shifting from the first mode to the second mode includes rotating the first and second components at approximately the same angular speed as the engageable transmission member moves from the disengaged position to the engaged position.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
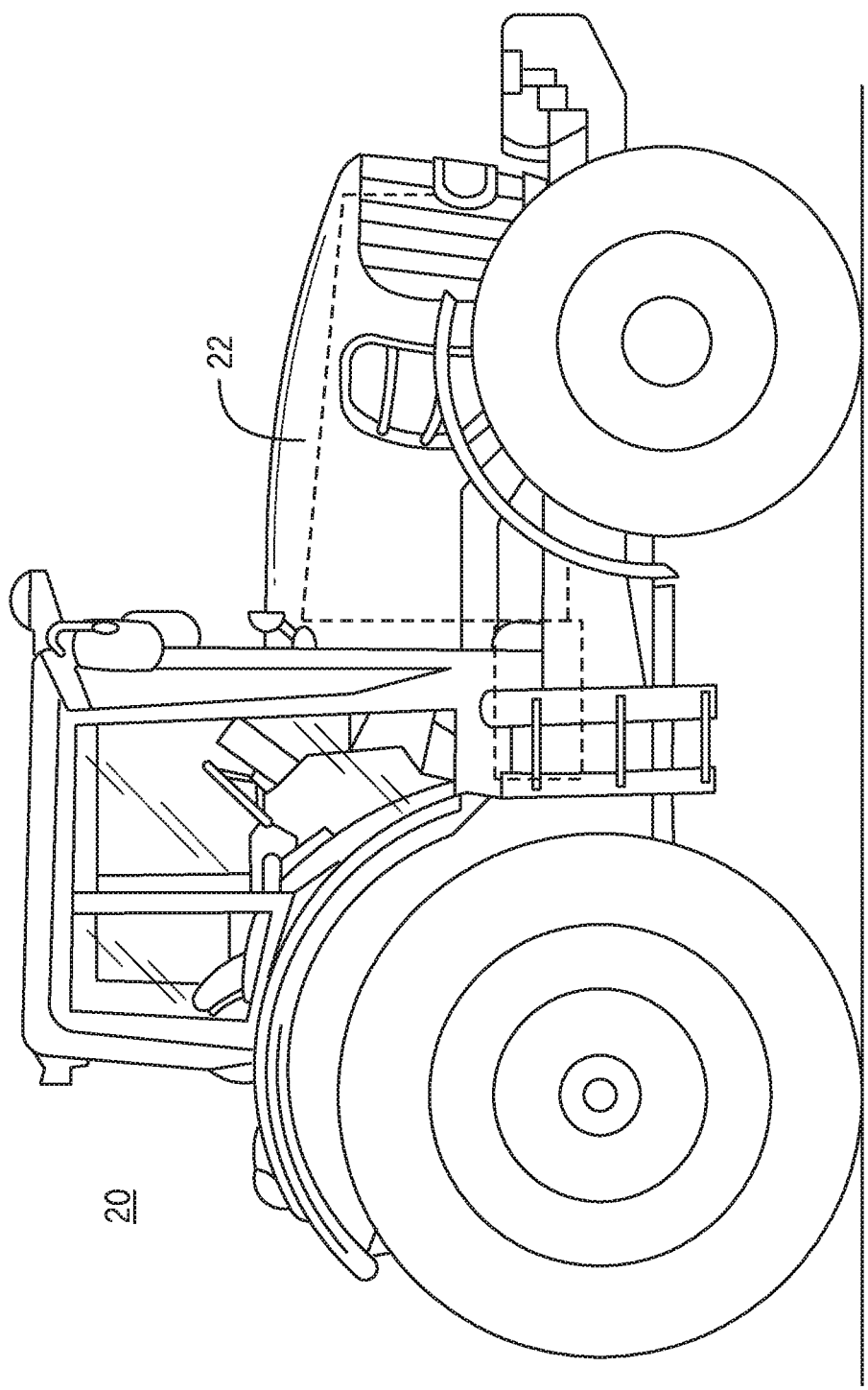
FIG. 1 is a side view of an example work vehicle that may include an infinitely variable transmission.

The following describes one or more example embodiments of the disclosed powertrain arrangement for energy storage and delivery, as shown in the accompanying figures of the drawings described briefly above. Various modifications to the example embodiments may be contemplated by one of skill in the art.

In various known configurations, one or more planetary gear sets may be utilized to combine the power output of an IVP and an engine (e.g., an internal combustion engine). For example, in a planetary gear set a first component of the gear set (e.g., a ring gear) may receive power from the engine, a second component of the gear set (e.g., a sun gear) may receive power from the IVP, and a third component of the gear set (e.g., a planet gear carrier) may sum the power from the engine and the IVP at the output of the gear set. (For convenience of notation, "component" may be used herein, particularly in the context of a planetary gear set, to indicate an element for transmission of power, such as a sun gear, a ring gear, or a planet gear carrier.) It will be understood that such a configuration may allow for essentially infinite and continuous gear ratios for the planetary gear set. For example, for a fixed engine speed, a particular gear ratio may be set by varying the speed of the IVP with respect to the engine speed.

In certain instances, it may be useful to facilitate a powered-zero mode for a vehicle (or other machinery), in which the output speed of the vehicle wheels (or other machinery output) reaches zero speed without stopping the engine or releasing torque at the wheels. In this way, for example, vehicle power may be utilized to hold a vehicle stationary. Such a state may be obtained, for example, with a planetary gear set configured as described above. For example, if an engine is spinning a sun gear at a first positive speed and an IVP (e.g., an electric motor powered by a generator) is directed to spin a ring gear at an equivalent negative speed, an associated planet gear carrier (which may, for example, be connected to a differential drive shaft) may not spin at all. Further, if the IVP provides an output rotation at a slightly different (and opposite) speed from the engine, the vehicle may enter a "creeper" mode, in which the vehicle moves very slowly but with high wheel torque. The powered-zero and creeper modes are particularly useful for heavy-duty work vehicles, such as the tractor shown in FIG. 1, used in the agricultural, construction and forestry industries. With increasing wheel speed, the vehicle may then, eventually, enter a normal drive mode. In traditional configurations, each of these modes may be split-path modes, in which power transmission is split between a purely mechanical path from the engine and the mixed path through the IVP.

One issue relating to infinitely variable powertrains may concern the relative efficiency of power transmission in various modes. It will be understood, for example, that mechanical transmission of power from an engine to a gear set (i.e., mechanical path transmission) may be a highly efficient mode of power transmission, whereas transmission of power through an IVP may be less efficient (e.g., because the mechanical power must be converted to electrical or hydraulic power by a first machine, transmitted to a second machine, and then converted back to mechanical power). Accordingly, there may exist significant motivation to utilize the mechanical path more heavily than the IVP path (e.g., by increasing the speed of the engine). However, this heavier utilization of the mechanical path may also drive up the required IVP speed for powered-zero and creeper modes, because these modes may require near or actual speed matching between the IVP and engine speeds. This may lead to increased wear on related gears and other parts (e.g., a planetary gear component receiving power from the IVP and associated bearings), even to the point of part failure. Further, to attain appropriate speeds, the size and power of a relevant IVP may need to be significantly increased from a preferred size and power. Among other advantages, the multi-mode infinitely variable transmission ("MIVT") disclosed herein may address these issues. For example, through selective use of clutches and/or brakes, an MIVT may allow heavier utilization of a mechanical path, while avoiding the need for excessive IVP speeds in powered-zero and creeper modes.

As will become apparent from the discussion herein, an MIVT may be used advantageously in a variety of settings and with a variety of machinery. For example, referring now to FIG. 1, an MIVT may be included in the powertrain 22 of a vehicle 20. In FIG. 1, the vehicle 20 is depicted as a tractor. It will be understood, however, that other configurations may be possible, including configuration of vehicle 20 as a different kind of tractor, as a log skidder, as a grader, or as one of various other work vehicle types. It will further be understood that the disclosed IVT may also be used in non-work vehicles and non-vehicle applications (e.g., fixed-location powertrains).

As also noted above, one advantage of the disclosed MIVT is that it may allow operation of a vehicle in a variety of powered modes (e.g., powered-zero mode, creeper mode, and split-path drive mode), which may utilize various combinations of engine and IVP power. For example, through the use of various clutches and/or brakes associated with one or more planetary gear sets, an MIVT may permit engine power to be disconnected from a IVT output, even while the engine continues to operate. For example, if an IVP drives a first component of a planetary gear set and an engine drives a second component of the planetary gear set, in certain embodiments and modes a clutch may disconnect the operating engine from the second component and a brake may stop rotation of a third component of the gear set, thereby allowing delivery of power solely from the IVP through the gear reduction of the planetary gear set. In this way, for example, only electrical power (or hydraulic power, and so on) may be utilized to drive (or hold) the vehicle 20 in certain modes, while combined electrical and engine power may be utilized to drive (or hold) the vehicle 20 in other modes. As such, among other benefits, an MIVT may avoid certain previous limitations on the fraction of power that may diverted from an engine through an electric path (or hydraulic path, and so on).

Figure 2:
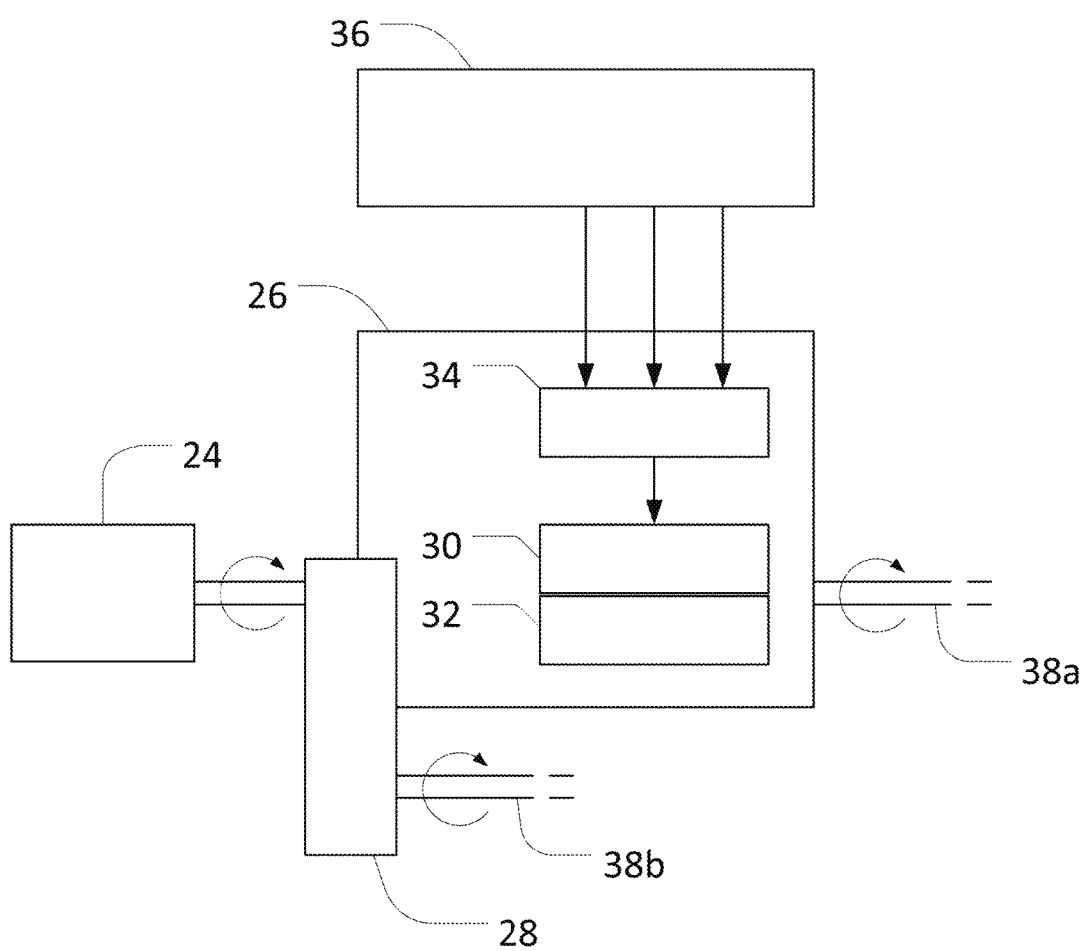
FIG. 2 is a schematic view of a powertrain of the vehicle of FIG. 1.

Referring now to FIG. 2, various components of an example powertrain 22 are depicted. For example, an engine 24 may provide mechanical power (e.g., via a rotating shaft) to an MIVT 26. The engine 24 may also provide mechanical power to an IVP 28, which may include one or more IVP machines (e.g., an electric motor and generator, or hydrostatic machine having a hydrostatic motor and associated pump). The MIVT 26a may additionally receive mechanical power from the IVP 28.

The MIVT 26a may include various clutches 30 and brakes 32, which may be controlled by various actuators 34. The actuators 34, in turn, may be controlled by a transmission control unit ("TCU") 36 (or another controller), which may receive various inputs from various sensors or devices (not shown) via a CAN bus (not shown) of the vehicle 20. The MIVT 26a may include one or more output shafts 38a for transmission of mechanical power from the MIVT 26a to various other components (e.g., a differential drive shaft). In certain embodiments, additional gear sets (e.g., a set of range gears) may be interposed between the MIVT 26 and other parts of the vehicle 20 (e.g., a differential drive shaft). In certain embodiments, the IVP 28 may also provide power directly to other parts of the vehicle 20 (e.g., via direct IVP drive shaft 38b).

Figure 3:
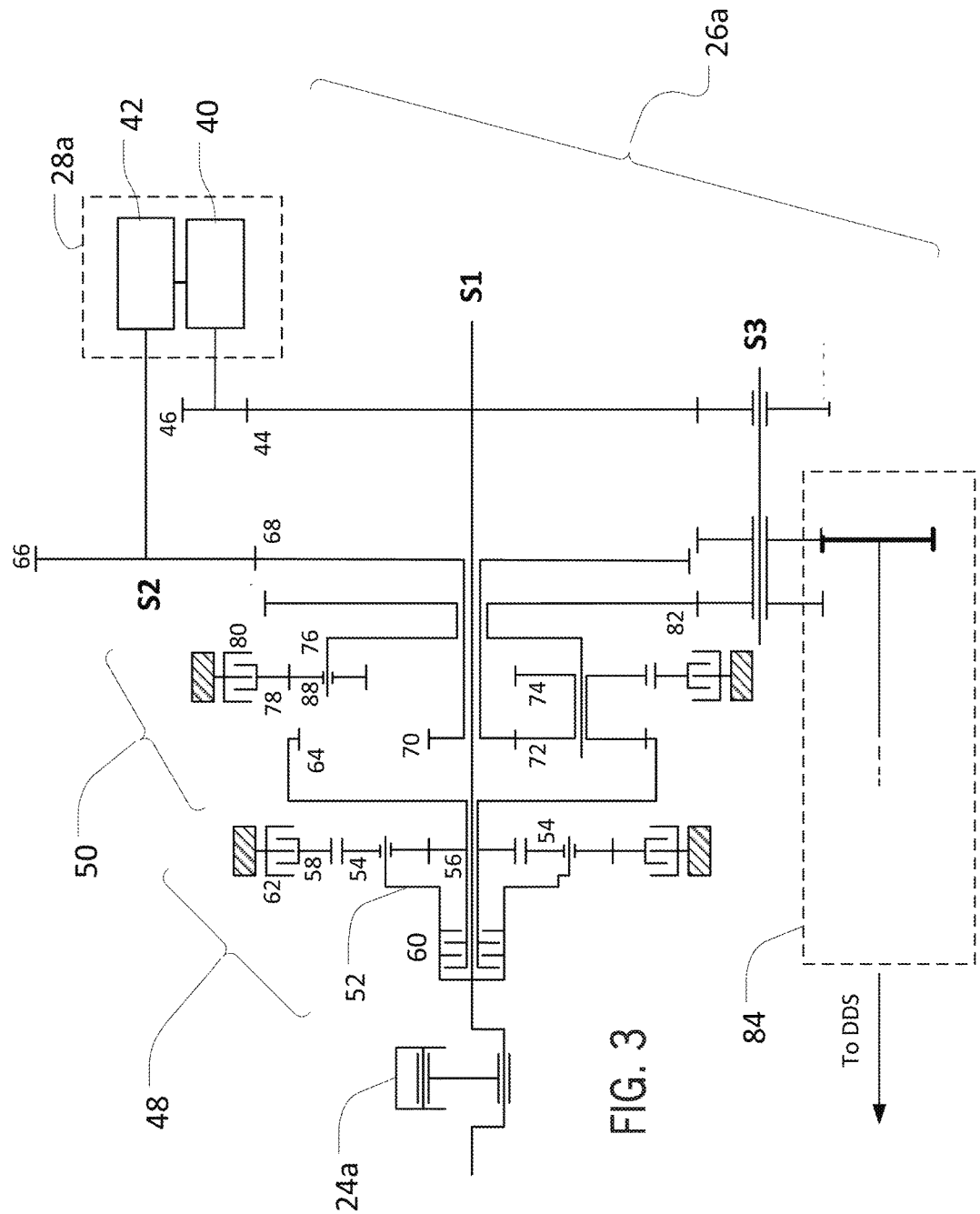
FIG. 3 is a schematic view of an infinitely variable transmission that may be included in the powertrain of FIG. 2.

Referring now to FIG. 3, various internal components of an example MIVT 26a are presented. It should be noted that the schematic representations of the transmission shown in FIG. 3 (and also the transmissions shown in FIGS. 5 and 7) illustrate example implementations in simplified form for clarity, and thus may not depict all of the components associated with the represented transmission. The engine 24 may include an internal combustion engine 24a, which may provide mechanical power directly to a shaft S1. (As used herein, "direct" power transmission may include transmission of power by direct physical connection, integral formation, or via a simple intervening element such as an idler gear or planet gear. In contrast, for example, power transmission between a ring gear of a planetary gear set and a sun gear of the planetary gear set via a planet gear carrier (and associated planet gears) of the planetary gear set may not be considered "direct.") An example IVP 28a may include an electric generator 40 and an electric motor 42. The electric generator 40 may receive mechanical power via a gear 46 and a gear 44, attached to the shaft S1, and may generate electrical power for transmission to an electric motor 42. The electric motor 42 may convert the received electrical power to mechanical power and thereby rotate a shaft S2.

Although specific terms such as "generator" and "motor" may be used herein to describe various example configurations, it will be understood that these (and similar) terms may be used to refer generally to an electrical machine that may be capable of operating either as a generator or as a motor. For example, the electric generator 40 may sometimes operate as an electric motor, and the electric motor 42 may sometimes operate as a generator. Likewise, it will be understood that the actual operating modes of other infinitely variable power sources may similarly vary from those explicitly described herein.

In certain embodiments, the MIVT 26a may include a planetary gear set 48 and a double planetary gear set 50. In certain embodiments, the planetary gear set 48 and the double planetary gear set 50 may be configured to sum mechanical power from the engine 24a and the IVP 28a. Through the use of one or more associated clutches and/or brakes, the MIVT 26a may provide an output, in certain modes, that utilizes only power from IVP 28a.

The planetary gear set 48 may include, for example, a planet gear carrier 52 holding planet gears 54, which may be meshed with a sun gear 56 and ring gear 58. Drive clutch 60 may be configured to engage planet gear carrier 52 and sun gear 56 (e.g., based upon signals from TCU 36) in order to control power transmission between these gears. For example, in a fully engaged state, drive clutch 60 may lock planet gear carrier 52 to sun gear 56. As depicted in FIG. 3, engine 24a may directly drive planet gear carrier 52 via shaft S1. Accordingly, engagement of clutch 60 may effectively lock sun gear 56 to shaft S1 and the output of engine 24a. Reverse brake 62 may be anchored to a fixed housing of MIVT 26a (or another feature) and may be configured to engage to stop the rotation of ring gear 58.

In certain embodiments, an output component of the planetary gear set 48 may directly transmit power to an input component of the double planetary gear set 50. For example, the sun gear 56 may be integrally connected with the ring gear 64, thereby directly connecting an output of planetary gear set 48 (i.e., the sun gear 56) to an input to double planetary gear set 50 (i.e., the ring gear 64).

The double planetary gear set 50 may also receive power input from the IVP 28a. For example, the electric motor 42 may drive the rotation of the shaft S2, along with an attached gear 66. The gear 66 may be meshed with a gear 68, mounted to the shaft S1, and the gear 68 may directly transmit power to (e.g., may be integrally formed with) a sun gear 70 of the double planetary gear set 50. The sun gear 70 may mesh with planet gears 72 (one shown), which may be directly connected with planet gears 74 (one shown), both sets of the planet gears 72 and 74 being carried by a planet gear carrier 76. Each of the planet gears 74 may mesh with one of various planet gears 88, which in turn may mesh with a ring gear 78. The planet gear carrier 76 may connect to the ring gear 78 (e.g., via planet gears 74 and 88), and a creeper brake 80 may be anchored to a fixed housing of the MIVT 26*a* (or another feature) and configured to engage the ring 78 to stop the rotation of that component.

Planet gear carrier 76 may provide a mechanical power output from the double planetary gear set 50 for transmission of mechanical power to various parts of the vehicle 20. For example, the planet gear carrier 76 may be integrally connected with an output gear 82, which may be meshed with a gear along an idler shaft S3. In certain embodiments, an additional gear box 84 (e.g., a range gear box) may be interposed between the MIVT 26*a* and other parts of the vehicle 20 (e.g., a differential drive shaft ("DDS")) or may be included as part of the MIVT 26*a*. In this way, for example, various gear shifts may be implemented over the baseline infinitely variable gear ratio provided by the MIVT 26*a*.

In certain modes of operation, the MIVT 26*a* (as configured in FIG. 3) may provide for powered-zero and creeper modes in which only power from the IVP 28*a* is provided to the wheels of the vehicle 20. For example, the drive clutch 60 may be disengaged and the brake 80 may be engaged with the ring gear 78 (or, in certain configurations, with the ring gear 64 (not shown)). This may, accordingly, disconnect the engine 24*a* from the double planetary gear set 50, while providing a fixed gear (e.g., the ring gear 78) around which the components of the double planetary gear set 50 may rotate. Mechanical power from the IVP 28*a* may be provided to the sun gear 70, which may drive the planet carrier 76 around the ring gear 78. This may, in turn, cause rotation of the output gear 82, driven by the IVP 28*a* but not by the engine 24*a*, which may allow for the driving of the wheels of the vehicle 20 (e.g., via the gear box 84) using only power from the IVP 28*a*.

In order to shift the vehicle out of this IVP-only mode, a reverse process to that described above may be executed. For example, the drive clutch 60 may be engaged, thereby connecting the engine 24*a* to the sun gear 56 and the ring gear 64. At the same time (or nearly the same time), the creeper brake 80 may be disengaged, thereby allowing the double planetary gear set 50 to provide an output at the gear 82 that represents a sum of the power from the IVP 28*a* and the engine 24*a*. It will be understood that this selective use of two of a set of friction elements (e.g., clutches and brakes) may generally facilitate transition between various operating modes for the vehicle 20.

In certain embodiments, it may be beneficial to effect a transition between modes (e.g., between an all-IVP creeper mode and a combined drive mode) in particular ways. For example, with the drive clutch 60 engaged, it may be possible to spin the sun gear 70 (via the IVP 28*a*) at a speed such that the ring gear 78 essentially stops, even without use of the brake 80. In order to provide for more seamless shifting between modes, it may be beneficial to shift between drive and creeper mode at such a point. In this way, for example, the brake 80 may be engaged and the clutch 60 may be disengaged with minimal disruption to vehicle operation. A similar seamless shift point may also be obtained for shifts from creeper to drive modes, and may represent a target point for those shift operations (and others). It will be understood, however, that in certain embodiments ramped (or other) modulation of the clutch 60 (or other components) may be utilized.

In certain applications, it may be desirable to operate the vehicle 20 in reverse, whether in creeper mode, drive mode, or otherwise. In the MIVT 26*a* as depicted in FIG. 3, for example, it may be possible to engage the reverse brake 62 for this purpose.

Figure 4:
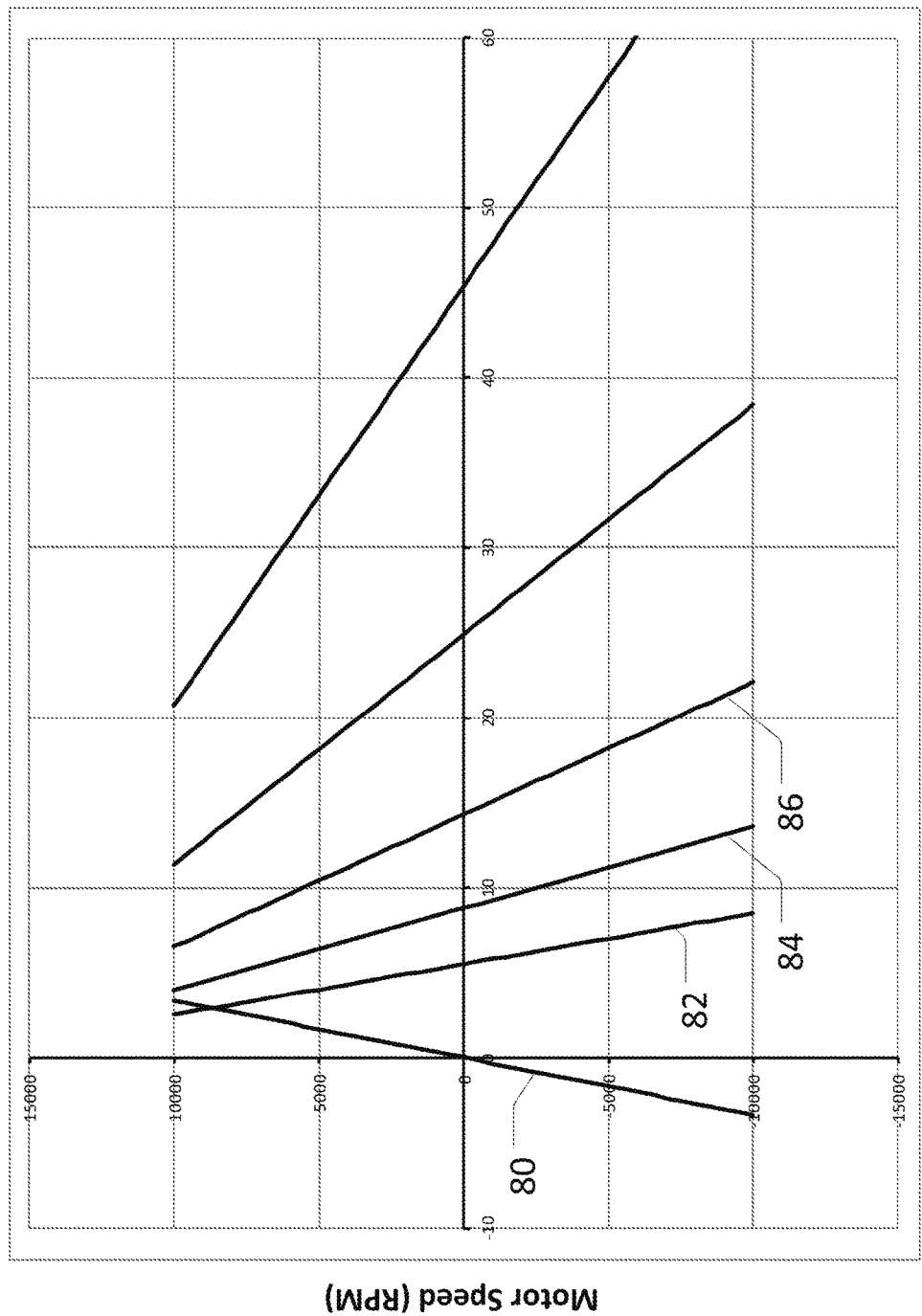
FIG. 4 is a graphical representation of infinitely variable power source speeds and vehicle wheel speeds for various modes of operation of the infinitely variable transmission of FIG. 3.

Referring now to FIG. 4, a graph is presented of the relationship between vehicle wheel speed (in kilometers per hour) and the speed of the electric motor 42 (in revolutions per minute) for the configuration of the MIVT 26*a* in FIG. 3. Various curves are presented for operation of the vehicle 20 with various range gears (not shown) engaged within the gear box 84. It will be understood that the quantities represented in FIG. 4 should be viewed as examples only.

A line 90, for example, may represent operation of the vehicle in a creeper mode (e.g., under electrical power only). It can be seen that at zero motor speed there may be zero vehicle speed, with non-zero motor speed directly proportional to vehicle speed. In creeper mode (e.g., with the brake 80 engaged, the drive clutch 60 disengaged, and an A-range gear (not shown) in the gear box 84 engaged), the vehicle 20 may accelerate to a transition point. For example, as described above, the vehicle 20 may accelerate to a point at which, based on the engine speed and relevant gear ratios, the ring 78 may be relatively stationary even without engagement of the brake 80. At this point (or another), the brake 80 may be disengaged and the clutch 60 engaged, thereby shifting the vehicle 20 into split-mode drive relatively seamlessly. The motor 42 may then begin to decelerate along a line 92, with vehicle speed (now driven in split-path mode by both the motor 42 and the engine 24*a*) increasing even as the speed of the motor 42 changes direction (i.e., passes from positive rotation to negative rotation).

Continuing, the vehicle 20 may be shifted from the A-range gear in the gear box 84 to a higher B-range gear (not shown). To continue acceleration of the vehicle 20, it may now be appropriate to switch the direction of the rotation of the motor 42, thereby jumping from negative rotation and the line 92 to positive rotation and a line 94. The motor 42 may then be decelerated again, followed by a further shift to a higher C-range gear (not shown) in the gear box 84 and a corresponding jump, for the motor 42, from the line 94 to a line 96. By modulating the rotation of the motor 42 in this way, shifts between various range gears of the gear box 84 may be accomplished with the same reduction ratio at the start of the shift (e.g., at the end of A-range driving) as at the end of the shift (e.g., at the beginning of B-range driving). (It will be understood that a reduction ratio may be the product of the gear ratios of the planetary gear sets 48 and 50 and the engaged gear (e.g., the A-range gear) of the gear box 84.)

Various benefits may obtain from the configuration of FIG. 3 (and others contemplated by this disclosure). For example, in the configuration of FIG. 3 (and other configurations) the gear box 84 may be located downstream of the planetary gear sets 48 and 50. This may allow the use of the full range of torques and speeds resulting at the output of the MIVT 26*a* (i.e., as may result from the various combinations of the power of the engine 24*a* and the motor 42) with each range or gear of the gear box 84. For example, an electric-only mode (or any of a variety of split-path modes) may be utilized with each range or gear of the gear box 84. This may provide significant flexibility during vehicle operation.

Additionally, in the configuration of FIG. 3 (and other configurations) split-mode drive may be implemented using a relatively simple planetary path, which may decrease wear, improve life, and decrease costs for the MIVT 26a, among other benefits. This may be particularly useful, for example, for applications in which a majority of operating time is expected to be spent in split-path mode (e.g., for various agricultural operations conducted with the vehicle 20). In split-path mode, for example, power from the engine 24a may be provided through the clutch 60 to the ring gear 64, and power from the motor 42 being provided to the sun gear 70. These components (i.e., the ring gear 64 and the sun gear 70) may together cause rotation of the planet carrier 76 (via the planet gears 72), which in turn may cause rotation of the gear 82 and the corresponding transfer of power into the gear box 84. In contrast, in an electric-only mode, power from the motor 42 may be provided to the sun gear 70 and then, in turn, to the planet gears 72, the planet gears 74 (which may be directly connected to or integrally formed with the gears 72), and the planet gears 88. With the ring gear 78 locked by the brake 80, power may then flow from the planet gears 72, 74 and 88 to the planet carrier 76, and so on. In this way, it will be understood, fewer gear meshes may be utilized in the split-path power mode than in the electric-only mode, which may represent a relative improvement in power transfer efficiency and may also result in a relative decrease in part wear.

Figure 5:
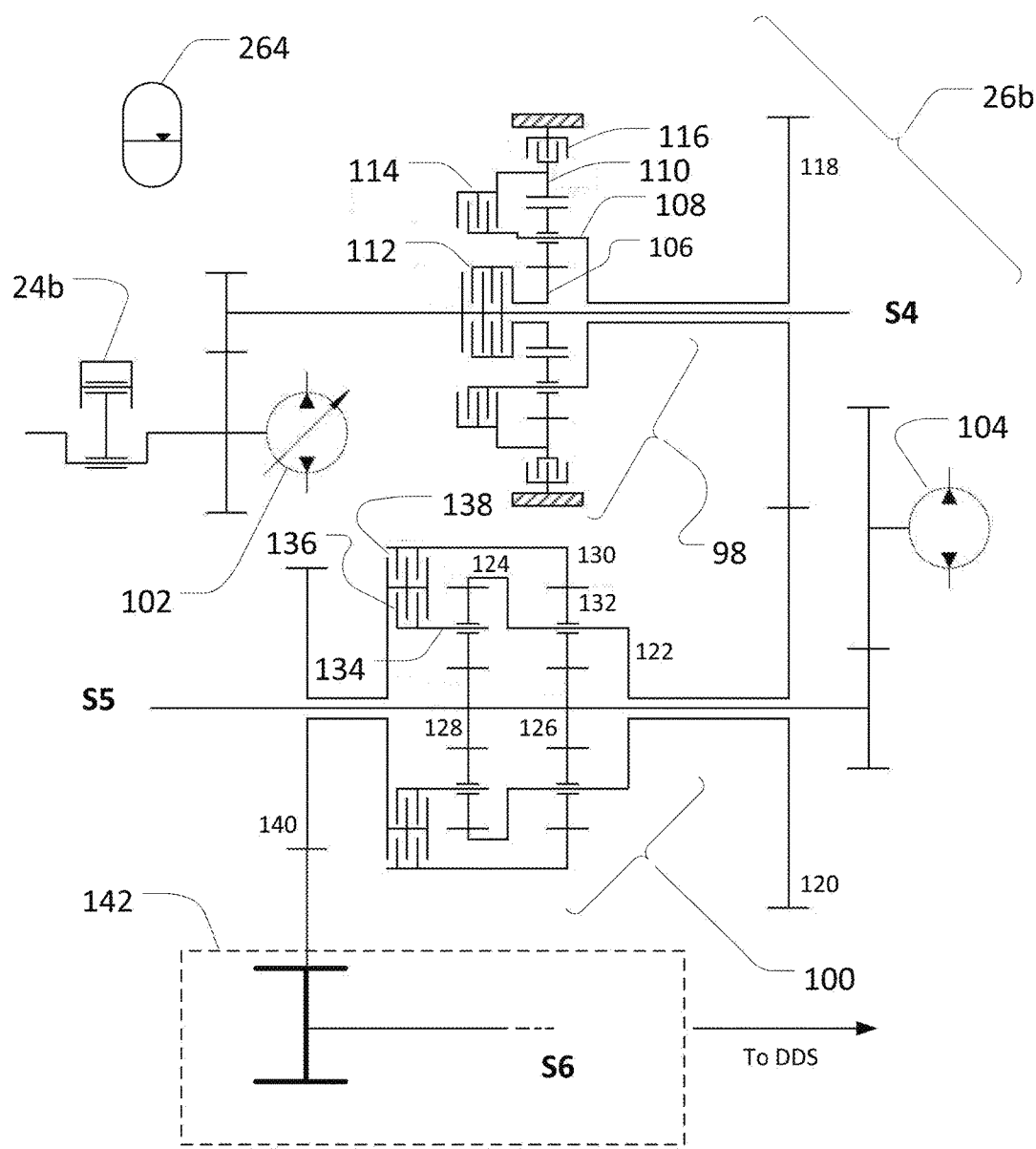
FIG. 5 is a schematic view of another infinitely variable transmission that may be included in the powertrain of FIG. 2.

Referring now also to FIG. 5, another example MIVT 26b is presented. As depicted in FIG. 5, the MIVT 26b may include planetary gear set 98 and a double planetary gear set 100. An internal combustion engine 24b may directly drive both a hydrostatic drive (e.g., a pump 102 and a motor 104) and a shaft S4, and the hydrostatic drive (e.g., via the motor 104) may drive a shaft S5. A planetary gear set 98 may include a sun gear 106, a planet gear carrier 108, and a ring gear 110. A drive clutch 112 may be configured to engage with the shaft S4 in order to connect the output of the engine 24b to the sun gear 106. A creeper clutch 114 may be configured to engage both the planet gear carrier 108 and the ring gear 110, thereby potentially locking the planet gear carrier 108 and the ring gear 110 together. A reverse brake 116 may be configured to engage the ring gear 110. In certain configurations, accordingly, the reverse brake 116 may be utilized to reverse the output of the planetary gear set 98 with respect to the output of the engine 24b.

The planetary gear set 98 may include an output that is directly connected (e.g., directly geared to or integral with) an input to the double planetary gear set 100. For example, as depicted in FIG. 5, the planet gear carrier 108 may be an output component for the planetary gear set 98 and may be directly geared (i.e., via gears 118 and 120) to a planet gear carrier 122 of the double planetary gear set 100. Further, in certain configurations, this input to the gear set 100 may rotate directly with another component of the gear set 100. For example, the planet gear carrier 122 may be formed as an integral component with a ring gear 124, such that both components rotate in unison.

The motor 104 may provide an additional input to the double planetary gear set 100. For example, via the shaft S5, the motor 104 may provide input power to both of sun gears 126 and 128. The double planetary gear set 100 may also include, for example, a ring gear 130, and a planet gear carrier 134.

In this configuration, similar to the discussion above regarding the embodiment of FIG. 3, various clutches and brakes associated with the MIVT 26b may be utilized to switch between various operating modes for the vehicle 20. For example, when the drive clutch 112 is disengaged power may not be transmitted from the operating engine 24b to the planetary gear set 98 or the double planetary gear set 100. Further, with the creeper clutch 114 engaged and the reverse brake 116 engaged, the gear 118 may be locked. Accordingly, engagement of the creeper clutch 114 and the reverse brake 116 may prevent rotation of both the ring gear 124 and the planet gear carrier 122 (although planet gears 132 may still rotate around the carrier 122). In this way, even though the engine 24b may be operating, the double planetary gear set 100 may transmit to an output gear 140 only power from the motor 104 (e.g., in either a forward or a reverse creeper-mode).

In certain embodiments, additional power-transfer components may be provided to facilitate various types of vehicle operation and operational modes. For example, a low clutch 136 and a high clutch 138 may be included within the double planetary gear set 100, with the high clutch 138 configured to engage both the ring gear 130 and the output gear 140, and with the low clutch 136 configured to engage both the planet gear carrier 134 and the output gear 140. Accordingly, in creeper or other modes, the clutches 136 and 138 may be selectively activated in order to adjust the effective total gear ratio of the two planetary gear sets 98 and 100.

In certain embodiments, a gear box 142 may be interposed between the double planetary gear set 100 and other parts of the vehicle 20 (e.g., a DDS), and may include various gears (e.g., range gears). Also in certain embodiments, the configuration represented in FIG. 5 may allow transition between fixed gear ratios within the gear box 142 (and in the context of the infinitely variable gear ratio provided by the hydrostatic machines 102, 104) without necessarily changing the direction of rotation for the motor 104. For example, the vehicle 20 may start operation at zero speed, with the engine 24b disconnected from the transmission (via the clutch 112) and with the clutch 114 and the brake 116 engaged. The motor 104, accordingly, may provide the sole power to the output gear 140 (and the gear box 142). The motor 104 may be started in the positive direction (for positive-direction creeper mode operation) or negative direction (for negative-direction creeper mode operation). Assuming, for example, an initial positive direction of travel, rotation of the motor 104 (and thereby the shaft S5) may accelerate in the positive direction, causing the sun gears 126, 128 to also accelerate. Initially, for example, the low clutch 136 may be engaged, whereby power may be transferred from the sun gear 128, via the planet gear carrier 134 to the output gear 140. Within the gear box 142, a first low range gear may be engaged, thereby completing the power transmission path from the motor 104 to other parts of the vehicle 20 (e.g., a differential drive shaft).

At a particular speed of the motor 104, depending on the particular associated gear ratios, the ring gear 110 may tend to be relatively stationary, even when the brake 116 is not engaged. As also noted above, this may provide a useful point at which to transition between operation modes (e.g., creeper mode and split-path mode) or various gears (e.g., range gears within the gear box 142). Accordingly, continuing the example above, once the motor 104 has accelerated through creeper mode to such a speed-matched point (or at various other times), the reverse brake 116 may be disengaged and the drive clutch 112 may be engaged. This may provide a mechanical transmission path for power from engine 24b to the double planetary gear set 100. At the same time (or nearly the same time), the low clutch 136 may also be disengaged and the high clutch 138 may be engaged. However, due to the configuration represented in FIG. 5, it may not be necessary at this point to reverse the rotational direction of the motor 104 in order to continue forward acceleration of the vehicle 20 (as it may be, for example, for the configuration represented in FIG. 3). In certain embodiments, after engagement of the clutch 112 (i.e., entry into a split-path mode), the rotational speed of the motor 104 may simply be decelerated from the rotational speed at the time of the transition, with the vehicle 20 accelerating accordingly.

Figure 6:
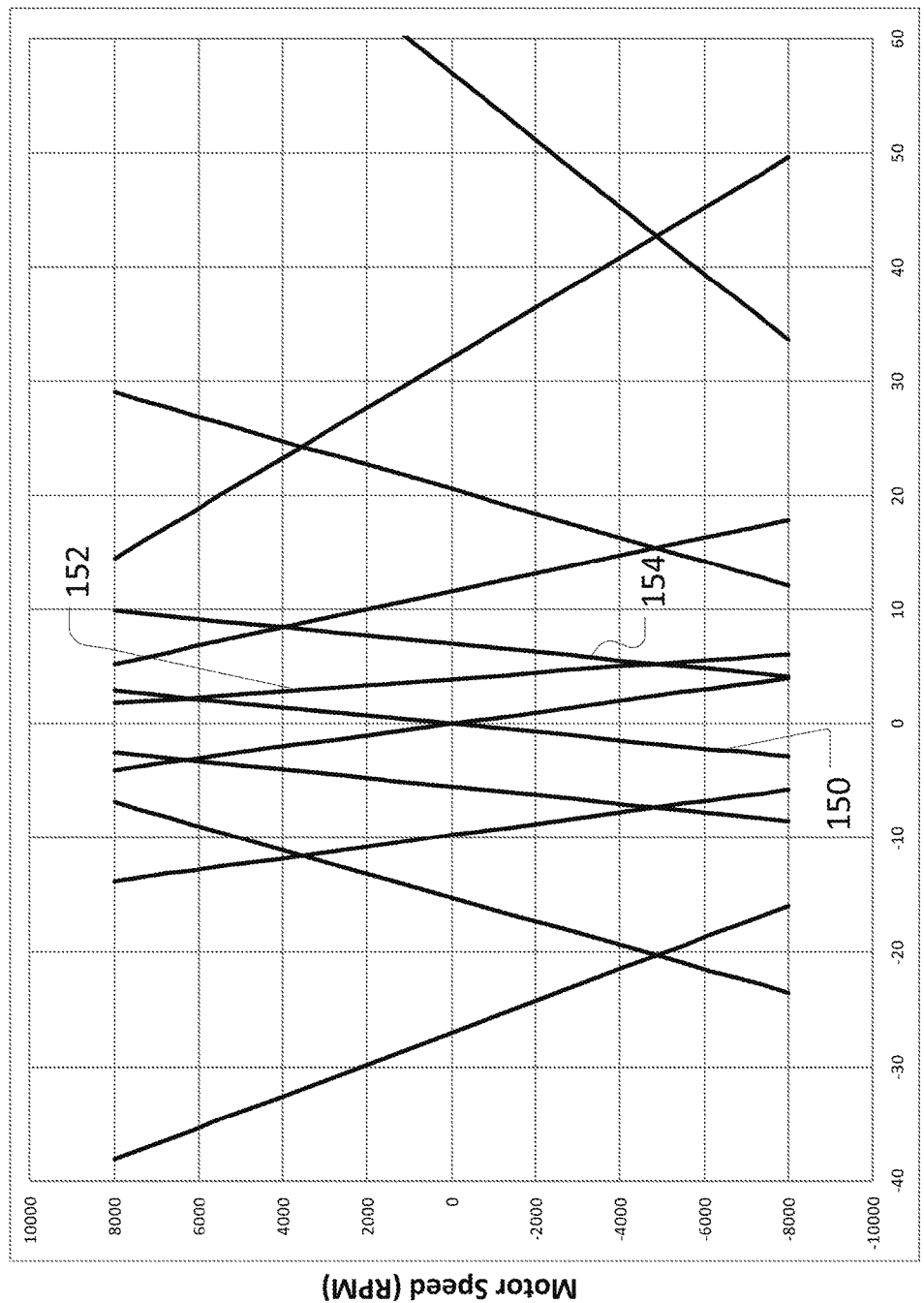
FIG. 6 is a graphical representation of infinitely variable power source speeds and vehicle wheel speeds for various modes of operation of the infinitely variable transmission of FIG. 5.

Referring now to FIG. 6, for example, a graph is presented of the relationship between vehicle wheel speed (in kilometers per hour) and the speed of the motor 104 (in revolutions per minute) for the configuration of the MIVT 26b in FIG. 5. Various curves are presented for operation of the vehicle 20 with various gears (e.g., range gears) engaged within the gear box 142. It will be understood that the quantities represented in FIG. 6 should be viewed as examples only.

A line 150, for example, may represent operation of the vehicle 20 in a creeper mode (e.g., under hydrostatic power only). It can be seen that at zero motor speed there may be zero vehicle speed, with non-zero motor speed being directly proportional to vehicle speed. In creeper mode (e.g., with the reverse brake 116 and the creeper clutch 114 engaged, the drive clutch 112 disengaged, and an A-range gear (not shown) in the gear box 142 engaged), the vehicle may accelerate to a transition point. In certain embodiments, this may be a point at which, based on the engine speed and relevant gear ratios, the ring gear 110 may be relatively stationary even without engagement of the brake 116. At this transition point (or another), the brake 116 may be disengaged and the clutch 112 engaged, thereby shifting the vehicle into split-mode drive. The motor 104 may then begin to decelerate along a line 152, with vehicle speed (now driven by both the motor 104 and the engine 24b) increasing even as the speed of the motor 104 changes direction (i.e., passes from positive rotation to negative rotation).

Continuing, the vehicle may be shifted from the former A-range gear in the gear box 142 to a higher B-range gear (not shown). To continue acceleration of the vehicle 20, it may again be appropriate to switch the direction acceleration of the rotation of the motor 104 (but not, immediately, the direction of rotation of the motor 104), and engage an appropriate range gear (with or without switching among the clutches 136 and 138). The motor 104 may then accelerate along a line 154, with the vehicle 20 accelerating accordingly.

Figure 7:
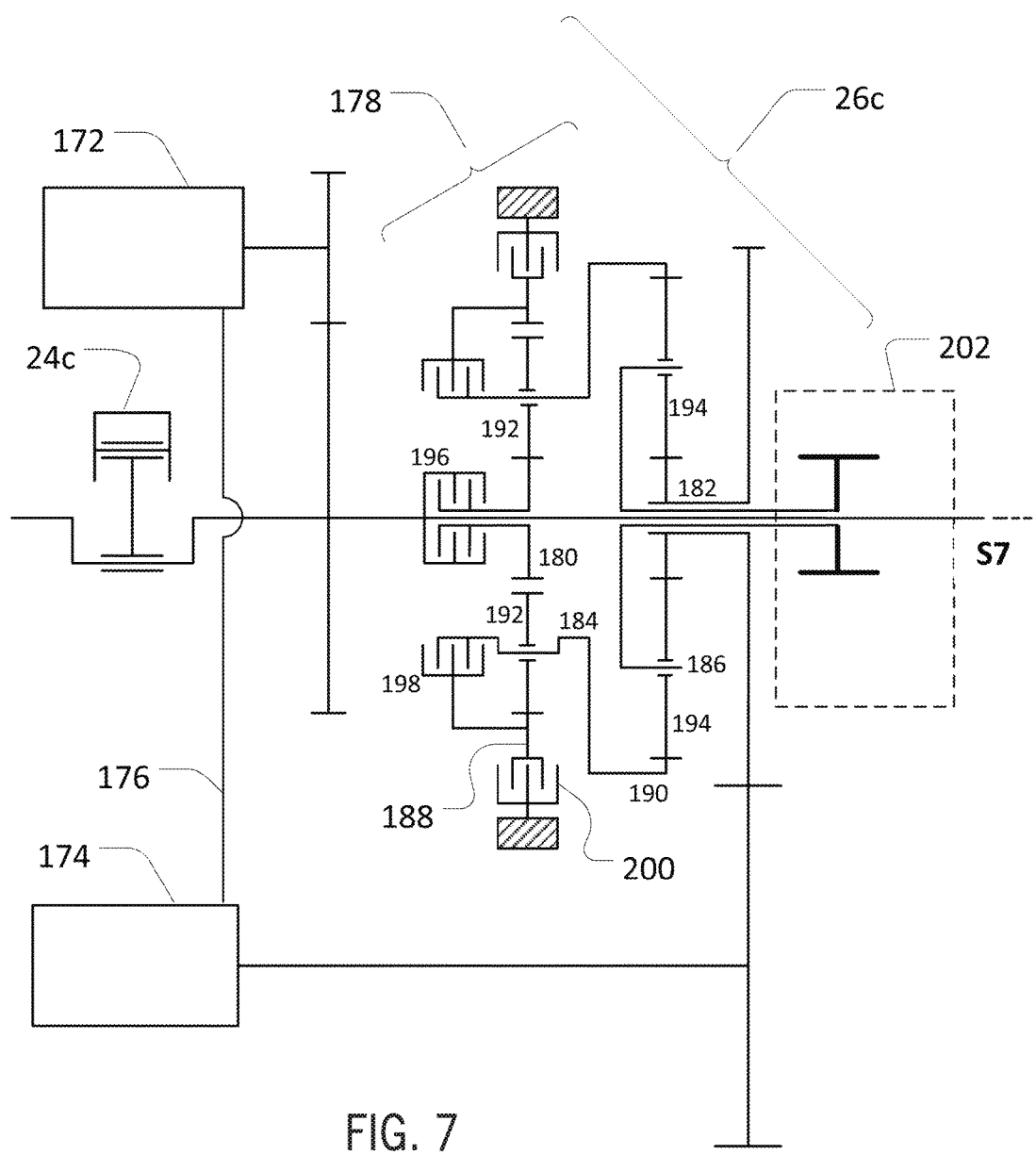
FIG. 7 is a schematic view of another infinitely variable transmission that may be included in the powertrain of FIG. 2.

Referring now to FIG. 7, an additional example MIVT 26c is presented. As depicted in FIG. 7, an internal combustion engine 24c may provide mechanical power to an electric generator 172, which may provide electrical power to an electric motor 174 via a power cable 176. The motor 174 may (e.g., via direct gearing) drive rotation of a sun gear 182 of a double planetary gear set 178. The gear set 178 may also be configured to receive mechanical power from the engine 24c via a shaft S7, with a drive clutch 196 configured to engage both the shaft S7 and another sun gear 180. A planet gear carrier 184, including planet gears 192 may be directly connected to (e.g., integral with) a ring gear 190, which may itself be configured to receive power from the sun gear 182 via a planet gear carrier 186. A ring gear 188 may be meshed with the planet gears 192. Further, the planet gear carrier 186 may form an output component of the gear set 178 and may, for example, be directly connected to (e.g., integrally formed with) an input component of a gear box 202.

As in other embodiments discussed herein, a number of clutches and brakes within the MIVT 26c (e.g., as represented in FIG. 7) may allow for useful transition between various operating modes, including a creeper mode powered only by the motor 174 and a split-path mode powered by both the motor 174 and the engine 24c. For example, the clutch 196 may engage with the shaft S7 and the sun gear 180 in order to transmit power from the engine 24c to the double planetary gear set 178. Likewise, a clutch 198 may engage both the ring gear 188 and the planet gear carrier 184 in order to lock these components together. Finally, a reverse brake 200 may engage the ring gear 188 in order to stop rotation of that gear.

In this light, it will be understood that the clutch 198, the brake 200 and the clutch 196 may be selectively engaged (and disengaged) in order to provide for various modes of operation. For example, with the clutch 196 disengaged and both the clutch 198 and the reverse brake 200 engaged, the vehicle 20 may be driven under the power only of the motor 174. Likewise, other operational modes may be possible with various other configurations (e.g., various combinations in which two of the clutch 198, the brake 200, and the clutch 196 are engaged).

Figure 8:
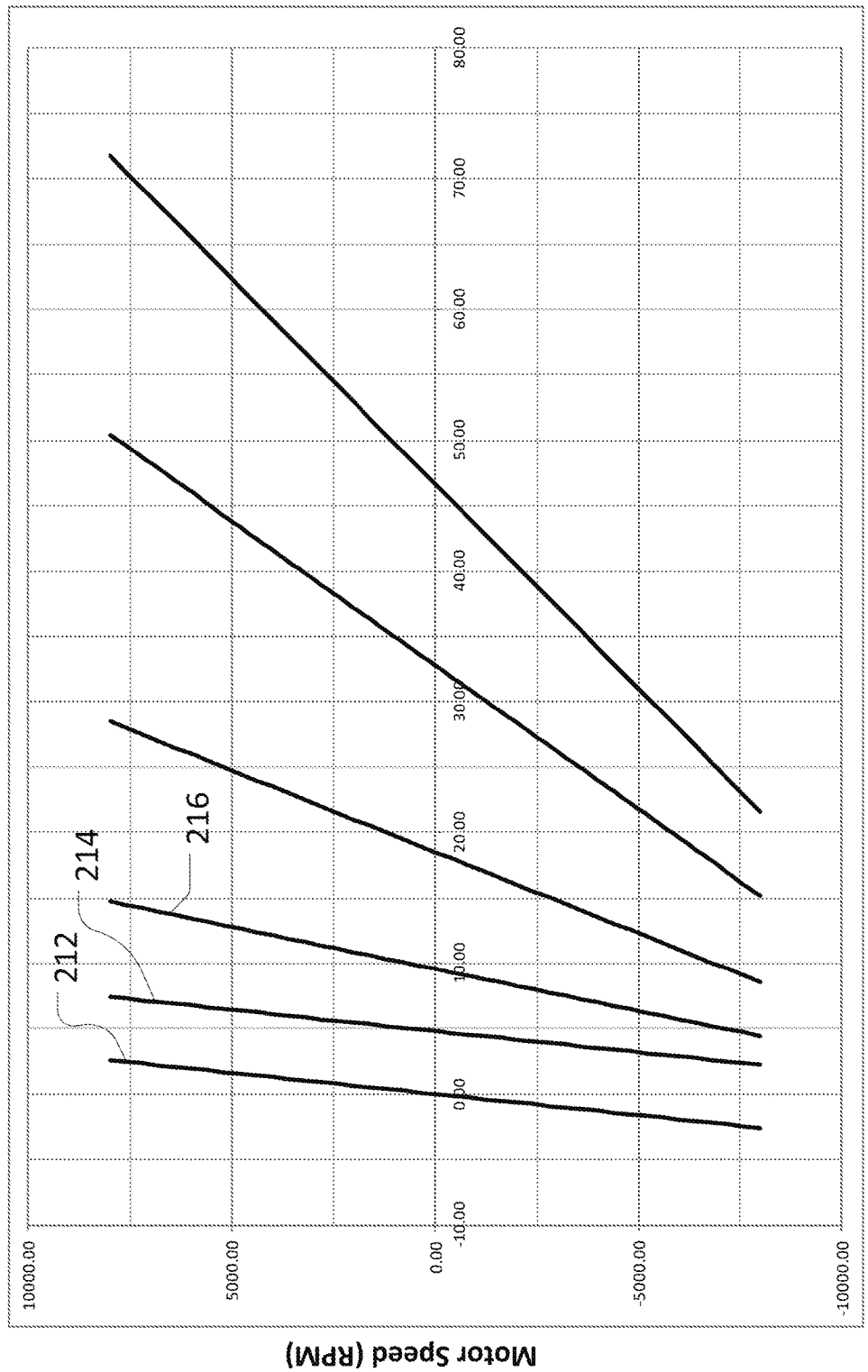
FIG. 8 is a graphical representation of variable power source speeds and vehicle wheel speeds for various modes of operation of the infinitely variable transmission of FIG. 7.

Referring now also to FIG. 8, for example, a graph is presented of the relationship between vehicle wheel speed (in kilometers per hour) and the speed of the motor 174 (in revolutions per minute) for the configuration of the MIVT 26c in FIG. 7. Various curves are presented for operation of the vehicle 20 with various gears (e.g., range gears) engaged within the gear box 202. It will be understood that the quantities represented in FIG. 8 should be viewed as examples only.

A line 212, for example, may represent operation of the vehicle 20 in a creeper mode (e.g., under electrical power only). It can be seen that at zero motor speed there may be zero vehicle speed, with non-zero motor speed relating proportionally to vehicle speed. In creeper mode (e.g., with the reverse brake 200 and the clutch 198 engaged, the drive clutch 196 disengaged, and an A-range gear (not shown) in the gear box 202 engaged), the vehicle 20 may accelerate to a transition point. For example, the vehicle 20 may accelerate to a point at which, based on the engine speed and relevant gear ratios, the ring gear 188 may be relatively stationary even without engagement of the brake 200). At this point (or another), the clutch 198 may be disengaged and the clutch 196 engaged, thereby shifting the vehicle into split-mode drive. At this time (or near this time) the motor 174 may then reverse its direction of rotation, thereby transitioning from the line 212 to a line 214. The vehicle 20, accordingly, may continue to accelerate (now driven by both the motor 174 and the engine 24c), with vehicle speed increasing even as the speed of the motor 174 changes direction (i.e., passes from negative rotation to positive rotation). Similar shifts may also be effected, for example, into a B-range gear (not shown) from the A-range gear (not shown) by transitioning the motor 174 from the line 214 to a line 216, and so on.

In certain embodiments, including with regard to various transmission configurations discussed above, it may be useful to provide a powertrain arrangement with energy storage and delivery ("ESD") capability for powering vehicle systems, in addition (or as an alternative) to a traditional engine. For example, with respect to the vehicle 20, it may be useful to provide one or more electric, hydraulic, or other energy storage devices as part of (or in communication with) the powertrain 22. Energy from the engine 24 may be received for storage at these devices (e.g., energy provided in mechanical form from the engine 24, then converted to non-mechanical forms for storage). The energy may then be released from storage for delivery to various vehicle components (e.g., a transmission or other powertrain assembly), in various beneficial ways.

In certain embodiments of the disclosed powertrain arrangement, an ESD system may be used to reduce the detrimental effects of transient power events for the vehicle 20. A transient power event may include events in which the power available from the engine 24 (at least under the current operating state of the engine 24) may be insufficient for one or more ongoing (or requested) operations. A transient power event may occur, for example, when a powered operation is requested by an operator, but the available (i.e., surplus) power from the engine 24 (at least at current operating conditions) is insufficient to complete the operation without detrimental effects (e.g., without reducing power supply to other vehicle systems). For example, while the engine 24 is actively powering various vehicle systems (e.g., a set of drive wheels), an operator may request an operation requiring additional power beyond that currently available from the engine 24. In certain embodiments, an ESD system may be utilized to supplement (or replace) available engine power for such an operation, while avoiding various issues (e.g., power lags, inefficient engine operation, jerking of the vehicle 20, and so on).

A transient power event may also occur, for example, when an engine is providing no power to the relevant powertrain. In certain embodiments, an ESD system may be utilized to provide power to various vehicle systems when an engine is in a shut off state, or is otherwise not operating.

In certain embodiments, a component of an IVP (e.g., an electric generator or hydraulic pump) may be configured to receive mechanical power from the engine 24 and convert the power to a different form (e.g., electrical power or hydraulic pressure/flow). A portion of the converted power may be routed to an energy storage device (e.g., a battery or accumulator) for storage. As needed (i.e., during a particular transient power event), stored energy may be then be released from the energy storage device to a component of the IVP (e.g., an electric motor or hydraulic motor) for conversion back to mechanical power. This mechanical power may then be routed through the vehicle 20, as needed. For example, an MIVT may be configured to receive power from the IVP, to supplement mechanical power received directly from the engine 24.

In certain implementations, an ESD system in the disclosed powertrain arrangements may be utilized to provide shift smoothing. During certain shift events of a transmission of the vehicle 20 (e.g., during transition from a first range or gear of a multi-stage transmission to a second range or gear of the multi-stage transmission) more power may be demanded at an input to the transmission than is available from the engine 24 (i.e., a transient power event may occur). For example, one or more clutches of the transmission may slip as the transmission begins to assume a post-shift-event load (e.g., an increased load). This slippage may result in power consumption within the transmission itself (e.g., due to the energy loss as the clutch slips), even as power is transmitted through the transmission to the transmission output. As such, the power required at the transmission input may be significantly larger than the power available at the transmission output.

As a result of this power loss (or other factors), various adverse events may occur with respect to the engine 24, the transmission, or other vehicle systems. For example, due to the excess power demand at the transmission input, the engine 24 may temporarily "droop" or suffer other reduced performance, which may be perceived by a user as a hesitation of the vehicle 20 (or of the engine 24). Similarly, the transmission may execute a sub-optimal shift, which may be perceived by a user as a jerking, stuttering, or even stalling of the vehicle 20.

Shift smoothing, as provided by an ESD system, may help to address these (and other) issues. For example, during steady (or other) operation of the vehicle 20, a portion of the power from the engine 24 may be routed to the ESD system (e.g., via an IVP) for storage (e.g., as stored electrical, hydraulic, kinetic, or other energy). During a shift event, as appropriate, the ESD system may then deliver a portion of the stored energy to the relevant transmission (e.g., via the IVP) in order to supplement the power provided directly by the engine 24. In this way, even if a shift event causes a power demand at a transmission that exceeds the (present) power output of the engine 24, power delivery from the ESD system may allow relatively smooth shifting operations. This may be useful, for example, in order to avoid the need to increase engine speed during shifting. Further, the use of an ESD system for shift smoothing may reduce the need for complex transmission designs (and controls), which might otherwise be necessary to provide smooth shifts across a variety of shift events.

An ESD system may provide various other benefits, in addition (or as an alternative) to shift smoothing. In certain embodiments, an ESD system may be utilized for load leveling, in which increases in demand for power during operations other than shift events may be met (at least in part) with stored energy from the ESD system, rather than with increased power delivery from the engine 24. In certain implementations, this may allow the engine 24 to be operated at a relatively constant load and relatively constant speed during a wide range of operations of the vehicle 20, which may in turn result in more efficient utilization of a given configuration of the engine 24. Likewise, an ESD system may be utilized to power operation of the vehicle 20 (or a sub-system thereof) without any ongoing power delivery from the engine 24. For example, in a "pure" electric (or hydraulic) mode, where the engine 24 may not be providing any power for operation of the vehicle 20, an ESD system may power operation of various vehicle systems, using previously-stored energy.

In certain embodiments, an ESD system may be included in, or may otherwise interface with, an IVP of the vehicle 20. For example, an IVP of the vehicle 20 may include a first IVP machine configured as an electric generator or hydraulic pump, which may be configured to receive mechanical power from the engine 24 and convert the power, respectively, to electrical or hydraulic (or other) form. A battery or accumulator (or other energy storage device) may be in communication with the first IVP machine such that a portion (i.e., part or all) of the converted power may be routed to the battery or accumulator for storage. A second IVP machine of the IVP (e.g., an electric motor or hydraulic motor) may be configured to receive power from the battery or accumulator (or directly from the first IVP machine), and convert the received power to mechanical form for downstream components of the vehicle powertrain 22.

An ESD system may be controlled in various ways. In certain embodiments, the routing of power to and from an ESD system may be regulated using a controller configured as a computing device of various designs (e.g., a processor and memory architecture, a programmable electronic circuit, and so on). In certain embodiments, for example, operation of an ESD system (as part of the disclosed powertrain arrangement) may be regulated by the TCU 36 or may be regulated by a different controller (not shown). An ESD system may be controlled based upon various inputs, including inputs from speed sensors (not shown) for the engine or other vehicle components, inputs from sensors (not shown) relating to shift operations, vehicle power consumption or demand, or inputs from various other devices (not shown).

Figure 9:
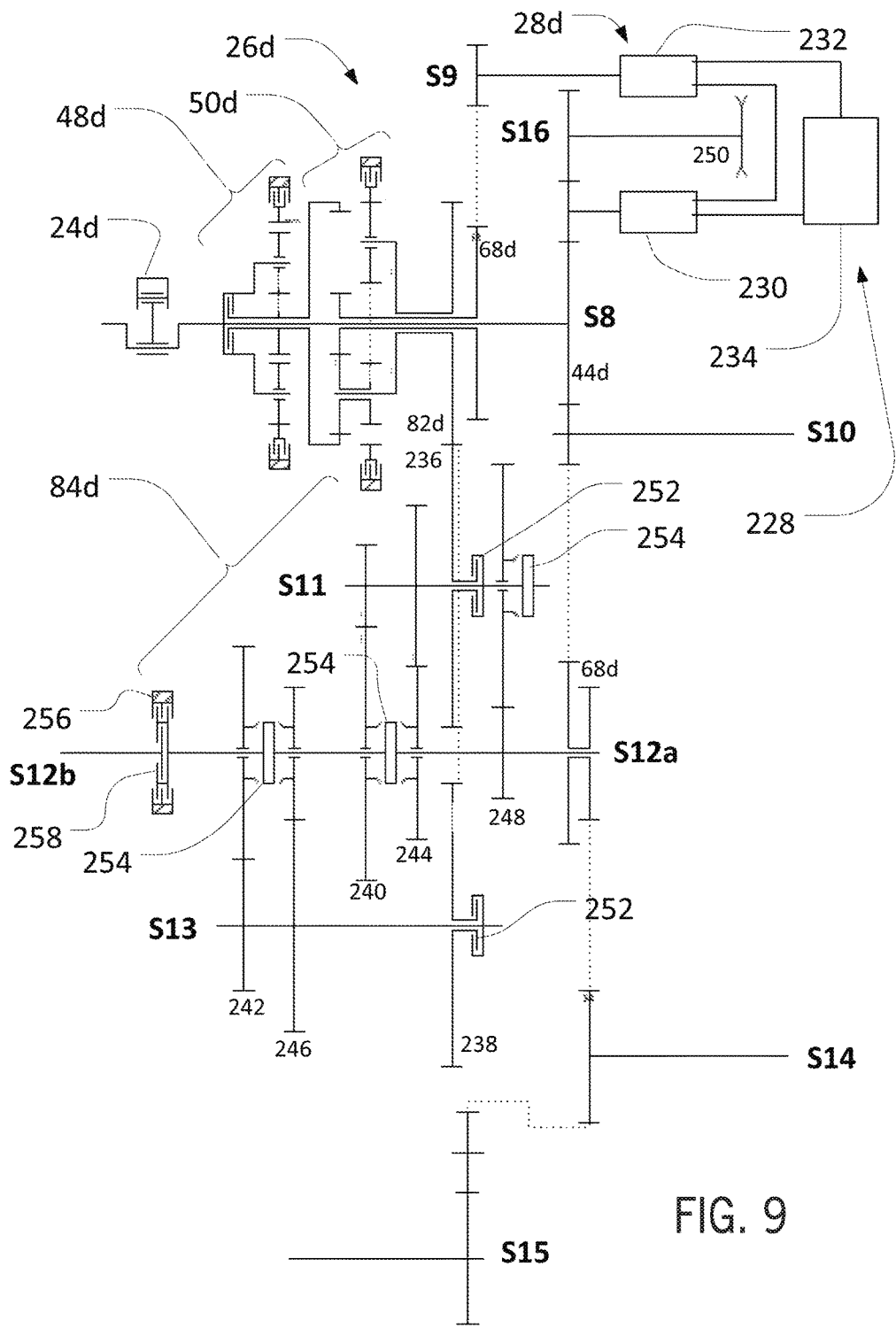
FIG. 9 is a schematic view of a powertrain similar to that of FIG. 3, with a power storage and delivery system.

Referring also to FIG. 9, an example powertrain arrangement including an ESD system is depicted. The powertrain of FIG. 9 is configured to transmit mechanical power from an internal combustion engine 24$d$ to various vehicle components and systems. As depicted, mechanical power from the engine 24$d$ is routed along a shaft S8 to a planetary gear set 48$d$ and a double planetary gear set 50$d$, as well as to an electric generator 230. (It will be understood that, in other configurations, a different IVP machine may be utilized in place of, or in addition to, the generator 230.) The generator 230 is in electrical communication with a battery 234 (or other storage device for electric energy) and with an electric motor 232. Collectively, the generator 230 and motor 232 may be viewed as an IVP 28$d$, in communication with an ESD system 228 that includes the battery 234 (or batteries 234, as appropriate) as well as various other components (not shown), including various power electronics, controllers, and so on.

The planetary gear set 48$d$ and double planetary gear set 50$d$, as well as the IVP 28$d$, is configured to operate in a similar fashion to the planetary gear set 48, double planetary gear set 50, and IVP 28$a$ of FIG. 3 (as discussed in detail above), in order to provide an MIVT 26$d$ with similar functionality to the MIVT 26$a$. The MIVT 26$d$ may exhibit various differences, however. For example, in FIG. 9, it can be seen that a shaft S16 is configured to receive power from the shaft S8 via the drive gear for the generator 230, in order to power rotation of an auxiliary drive pulley 250. Likewise, a shaft S10 powered by a gear 44$d$ of the shaft S8 (which also provides power to the generator 230) may provide power to transmission control, scavenge, and other pumps.

During operation, power from the engine 24$d$ may be routed in various ways through the MIVT 26$d$ to a gear box 84$d$ (e.g., configured as a controllable gear box), in order to provide infinitely variable, multi-mode power transmission to various vehicle systems. As depicted, for example, an output gear 82$d$ of the double planetary gear set 50$d$ is configured to mesh with input gears 236 and 238 of the gear box 84$d$. Through the selective operation of clutches 252, the output gear 82$d$ may accordingly power rotation of one of the transmission shafts S11 and S13, respectively. Selective control of various other clutches 254 may be utilized to shift the gear box 84$d$ among various range gears 240, 242, 244, 246 and 248, which may correspond, respectively, to ranges A through E for the gear box 84$d$. In this way, power may be routed from the engine 24, as well as from the motor 232, to the differential drive shaft 512$a$. Also as depicted, a brake 256 and clutch 258 may be controlled to transmit power from the gear box 84$d$ to a drive shaft 512$b$ for mechanical front wheel drive. (It will be understood that the depicted configuration of the various gears of the gear box 84$d$ is presented as an example only. An ESD system may also be utilized with regard to other configurations of the gear box 84$d$).

Other devices and functionality may also be provided. For example, it can be seen that the gear 44$d$ of the shaft S8 is configured to rotate an idler gear 68$d$ on the shaft S12$a$, as well as to provide power to the generator 230. In turn, the gear 68$d$ may power rotation of a PTO shaft S14 and, in certain configurations, a front PTO shaft S15.

As regulated by an appropriate controller (not shown), a portion of the power received at the generator 230 may be routed, once converted to electrical form, to the ESD 228 for storage in the battery 234. In certain implementations, power may be routed from the generator 230 to the battery 234 continuously, as long as the engine 24$d$ is running and the battery 234 is not fully charged. In certain implementations, power may be routed from the generator 230 to the battery 234 more selectively. For example, under certain control strategies, power may be routed from the generator 230 to the battery 234 only when it has been detected (e.g., via various engine or other sensors (not shown)) that the engine 24$d$ is producing surplus power with regard to the current power demands of vehicle operation.

As needed, energy may be released from the battery 234 to power operation of the motor 232. As described above, with regard to motor 42 of FIG. 3, power from the motor 232 may then be routed through the double planetary gear set 50$d$ in order to supplement (or replace) power from the engine 24$d$. This may be useful, for example, in order to ensure that appropriate power is provided to the various systems and devices of the vehicle 20, even while the engine 24$d$ is maintained at an optimal, and relatively constant operating speed.

In certain implementations, power from the battery 234 may be utilized, via the motor 232, for shift smoothing operations. For example, during (or before or after) a shift from the A-range gear 240 to the B-range gear 242, a relevant controller may identify that additional power may be required at the gear box 84$d$ in order to ensure a smooth shift and, in certain embodiments, to avoid the need to increase engine speed or power. Accordingly, for the A-to-B shift event (and other shift events), energy may be released from the battery 234 to the motor 232, such that the motor 232 may provide additional power to the gear box 84$d$ (i.e., via the double planetary gear set 50$d$).

Shift smoothing, such as in the example described above, may be implemented based upon a variety of factors. In certain implementations, for example, a signal from the TCU 36 (or other device) may indicate that a shift between gears of the gear box 84$d$ is about to occur (or is occurring or has recently occurred). Where such a shift event is identified as (or expected to) result in a transient power event, power may be routed from the ESD 228 accordingly. In certain implementations, engine sensors, shaft speed sensors, or other sensors (not shown) may detect indications of a power deficiency at the gear box 84$d$ (e.g., due to clutch slippage within the gear box 84$d$ during a shifting operation). Routing of power from the ESD 228 to the gear box 84$d$ may then be implemented accordingly.

In certain implementations, power from the battery 234 may be utilized for other operations. For example, where operation of the engine 24$d$ may not be possible or practical (e.g., during operation of the vehicle 20 within an enclosed space), energy from the battery 234 may be utilized to implement electric-only operation of the vehicle 20. In certain implementations, electric-only operation may be implemented automatically (e.g., based upon receiving a drive or other command when the vehicle is keyed on, but the engine 24$d$ is off). In certain implementations, electric-only operation may be implemented based upon other factors (e.g., based upon an operator toggling a particular switch, button, or lever).

As another example, where use of a particular vehicle tool imposes increased power demands on the vehicle 20, energy from the battery 234 may be utilized to ensure that appropriate power is available at the tool, without significantly adverse effect on the operation of other vehicle systems (e.g., the vehicle drive wheels) or a significant increase in engine speed. For example, where a mechanical tool (e.g., a baling device, seeding device, soil-conditioning device, cutting blade, and so on) is being driven by the PTO shaft S14, or a hydraulic tool (e.g., a loading bucket, dump truck bed, excavator arm, soil-conditioning device, and so on) is being operated using power from the front PTO shaft S15 or another shaft (i.e., as converted by an appropriate hydraulic pump (not shown)), the drive train of the vehicle 20 may be subjected to increased power demands. In certain embodiments, accordingly, during operation of such a tool, energy from the battery 234, as converted to mechanical energy by the motor 232, may be utilized to supplement (or replace) power from the engine 24*d* with respect to the relevant tool (or other vehicle systems).

In certain implementations, power from the battery 234 may be utilized automatically, whenever any vehicle tool (or any vehicle tool of particular configuration) is operated. In certain implementations, power from the battery 234 may be utilized more selectively. For example, engine sensors, shaft speed sensors, or other sensors (not shown) may detect indications of a power deficiency due to tool operation, and power may be drawn from the battery 234 appropriately.

Figure 10:
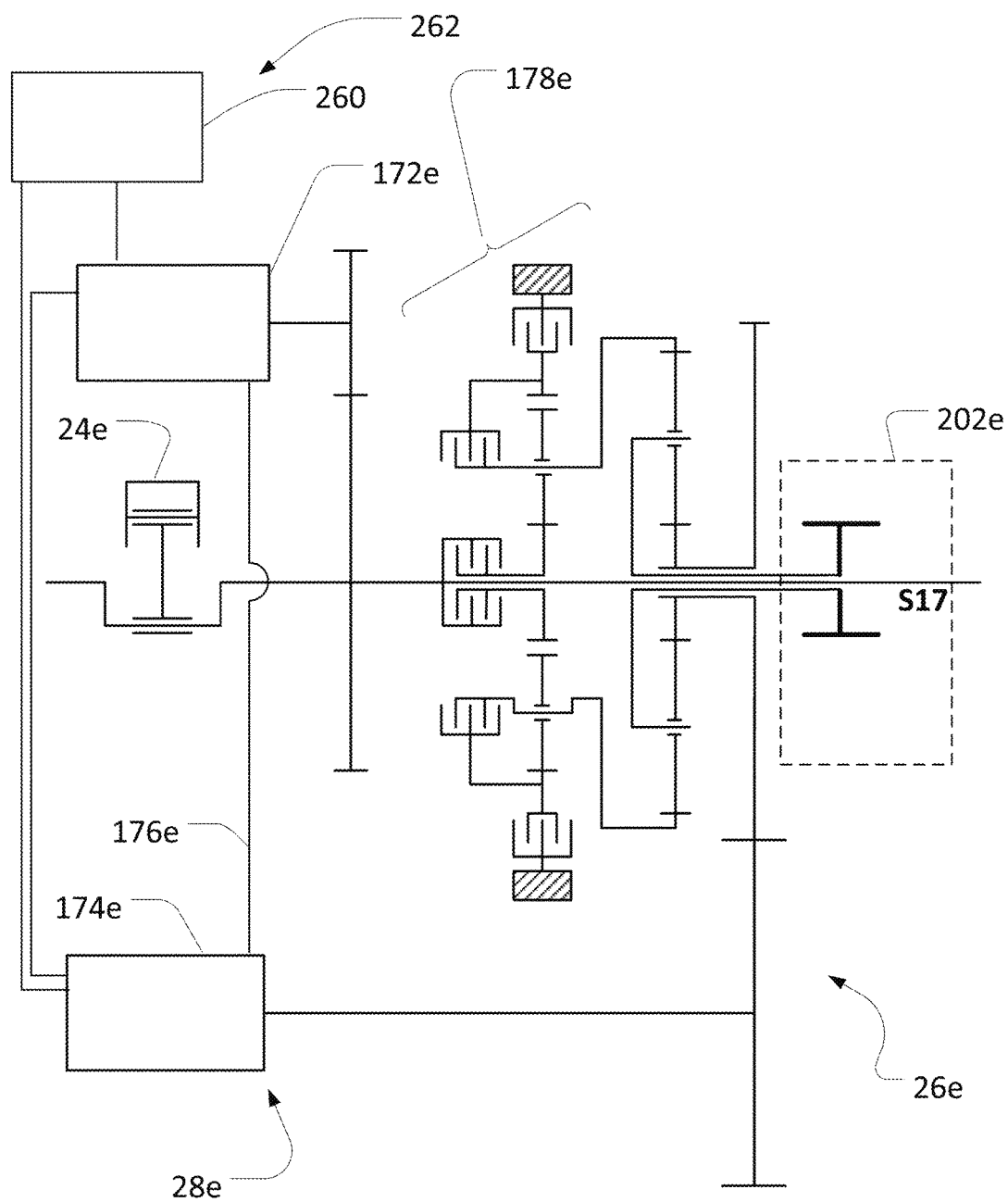
FIG. 10 is a schematic view of a powertrain similar to that of FIG. 7, with another power storage and delivery system.

Referring also to FIG. 10, another example MIVT 26*e* is configured similarly to the MIVT 26*c* of FIG. 7. An internal combustion engine 24*e* provides mechanical power via a shaft S17 to a double planetary gear set 178*e* as well as to an electric generator 172*e* (or other IVP machine) included in an IVP 28*e*. The generator 172*e* converts the mechanical power from the engine 24*e* to electrical power, which is routed to an electric motor 174*e*. The motor 174*e* then converts the electrical power to mechanical power, which is also routed to the double planetary gear set 178*e*. In this way, the MIVT 26*e*, via the double planetary gear set 178*e*, may be utilized to combine power from the engine 24*e* and the IVP 28*e*, in order to provide continuously variable power to a transmission 202*e*.

In the embodiment depicted, the generator 172*e* is in electrical communication with a battery 260 (or other storage device for electric energy), as well as with the motor 174*e*. In this way, mechanical energy from the engine 24*e* may be stored as electrical energy in the battery 260, and released, as appropriate, via the motor 174*e*, to provide power to the double planetary gear set 178*e*. As described in detail with respect to the configuration of FIG. 9, energy from the battery 260 may be utilized to provide shift smoothing, to operate the vehicle 20 in an electric-only mode, to power operation of a tool of the vehicle 20 (or to power other vehicle systems during operation of such a tool), and so on.

It will be understood that the various storage devices of an ESD system (e.g., the batteries 234 and 260) may receive and store energy from sources other than the relevant engine (e.g., the engines 24*d* and 24*e*). For example, in certain implementations, regenerative systems (e.g., systems for capturing energy from braking operations) may be configured to route power to an ESD system for later use (e.g., for shift smoothing, electric-only operation, and so on) or may form part of an ESD system. Likewise, it will be understood that an ESD system may be utilized with powertrains and transmissions (including MIVTs) other than those specifically depicted. In certain embodiments, for example, an ESD system (not shown) may be implemented with respect to the powertrain depicted in FIG. 5 via a hydraulic accumulator 264 (see FIG. 5, hydraulic connections not shown), or with respect to various other powertrain configurations (not shown).

Figure 11:
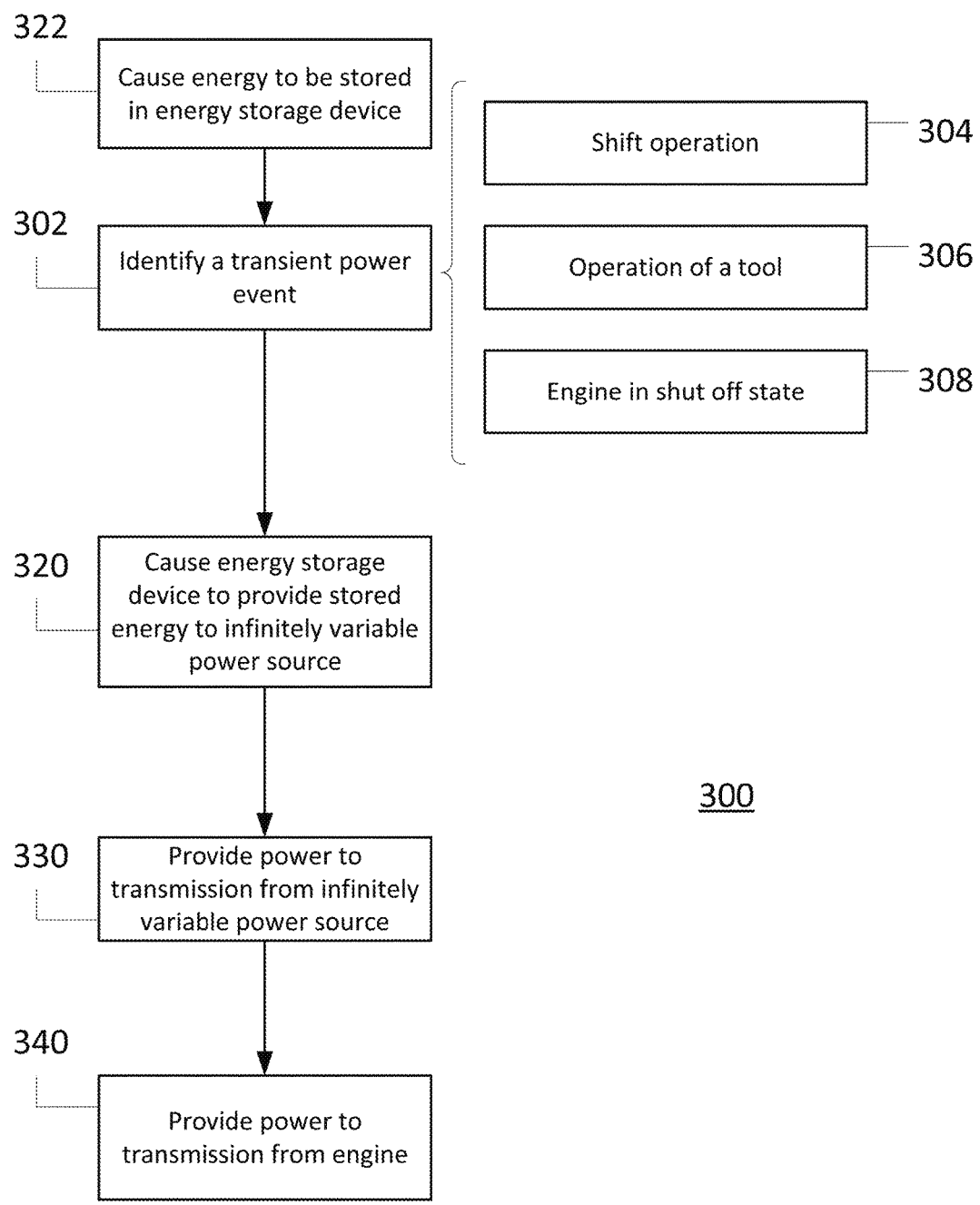
FIG. 11 is a diagrammatic view of a transient power event management process, which may be used with the powertrains of FIGS. 9 and 10.

Various of the operations described above (and others) may be implemented as part of a transient power event management ("TPEM") method. Referring also to FIG. 11, for example, a TPEM method 300 may be implemented for the vehicle 20 by various controllers (e.g., the TCU 36) or other devices.

The TPEM method 300 may include identifying 302 a transient power event. For example, by way of an engine speed sensor, various shaft speed sensors, other sensors or devices, a controller may identify 302 that a current (or imminent) operating state of the relevant vehicle has resulted (or is likely to result) in a power deficiency. For example, a shift operation 304 (e.g., a, recent, ongoing, or imminent shift operation 304) may be identified 302, during which a transmission may demand more power from an engine (e.g., due to clutch slippage) than may be available from the engine (at least in the current operating state). For example, due to clutch slippage during a shift event, more power may be demanded from the engine at the input to a transmission than is available from the engine at the current engine speed. Similarly, operation 306 of a tool (e.g., an ongoing or imminent operation 306 of the tool) may be identified 302, during which the power requirements of the tool (e.g., in combination with other power requirements for other vehicle systems) may exceed the available power from the engine. In certain implementations, identifying 302 a transient power invent may include identifying 302 the operation of the vehicle (or a subsystem thereof) while the engine is in a shut off (or otherwise un-powered) state 308. For example, a drive operation or the operation of a vehicle tool (e.g., an ongoing or imminent drive or tool operation) may be identified 302 while the engine is in a shut off state 308.

The method 300 may further include causing 320 an energy storage device (e.g., as may form part of a larger ESD system) to provide stored energy to a component of an IVP (e.g., an IVP machine). For example, the method 300 may be utilized to cause 320 energy from a battery to be provided to an electric motor, to cause 320 energy from a hydraulic accumulator to be provided to a hydraulic motor, and so on. (In certain implementations, it will be understood that this may be preceded by the method 300 causing 322 energy to be stored in the IVP. In certain implementations, energy may be stored in the IVP in other ways.)

The method 300 may then include providing 330 power from the component of the IVP (e.g., from an IVP machine) to a transmission. For example, the method 300 may include providing 330 power from an electric or hydraulic motor to an MIVT of various configurations, to a transmission with fixed gear ratios, or to other transmissions included in the relevant powertrain.

In certain implementations, the method 300 may further include providing 340 power to the transmission from the engine. For example, where the engine is not in a shut-off state 308, an MIVT (or other device) may be utilized to sum the power received, respectively, from the engine and from the IVP, such that power from both the engine and the IVP may be provided 330, 340 to the relevant transmission.

Referring now to FIGS. 12-16, the present disclosure will be discussed according to additional example embodiments. It should be noted that the schematic representations of the powertrains shown in FIGS. 12, 14, 15, and 16 illustrate example implementations in simplified form for clarity, and thus may not depict all of the components associated with the represented powertrain.

As will be discussed, the powertrain of the present disclosure provides a multi-mode infinitely variable transmission (IVT). The IVT provides split-path power transmission, combining power from an engine and at least one infinitely variable power (IVP) machine. For example, the powertrain may include an engine, a first electrical machine, and a second electrical machine.

As mentioned above, it may be useful to facilitate a powered-zero mode for a vehicle (or other machinery), in which the output speed of the vehicle wheels (or other machinery output) reaches zero speed without stopping the engine or releasing torque at the wheels. In this way, for example, vehicle power may be utilized to hold a vehicle stationary. Such a state may be obtained, for example, with a planetary gearset. For example, if an engine is spinning a sun gear at a first positive speed and an IVP machine (e.g., an electric motor powered by a generator) is directed to spin a ring gear at an equivalent negative speed, an associated planet gear carrier (which may, for example, be connected to a differential drive shaft) may not spin at all. Further, if the IVP provides an output rotation at a slightly different (and opposite) speed from the engine, the vehicle may enter a "creeper" mode, in which the vehicle moves very slowly but with high wheel torque. The powered-zero and creeper modes are particularly useful for heavy-duty work vehicles, such as the tractor shown in FIG. 1, used in the agricultural, construction and forestry industries. With increasing wheel speed, the vehicle may then, eventually, enter a normal drive mode (i.e., "field mode").

As will be discussed, in at least one mode of the IVT of the present disclosure, split-path power transmission may be provided wherein the powered-zero state can be achieved. Split-path power transmission may continue as the speed of the vehicle increases from the powered-zero state, into the creeper mode(s). Moreover, in at least one mode, the first IVP machine and a second IVP machine may co-generate electricity to satisfy electrical demands. The IVP machines may co-generate when the vehicle is in the powered-zero state and as the vehicle speed increases therefrom into the creeper mode(s). Thus, the vehicle may be useful for performing a wide variety of work while simultaneously satisfying high electrical demands of various electrical components.

Additionally, the IVT may be configured in a variety of ways, wherein the above-described split-path, powered zero with electrical co-generation capability may be an optional feature for a particular IVT. Accordingly, the IVT may be modular and configurable. Stated differently, the IVT may have a first configuration (e.g., FIG. 12) in which the IVT provides split-path, powered-zero, co-generation capability, and a second configuration (e.g., FIG. 14) in which the IVT does not provide this capability. Accordingly, the transmission may be configured according to the type of work to be performed by the vehicle, according to space constraints within the vehicle, or otherwise.

Figure 12:
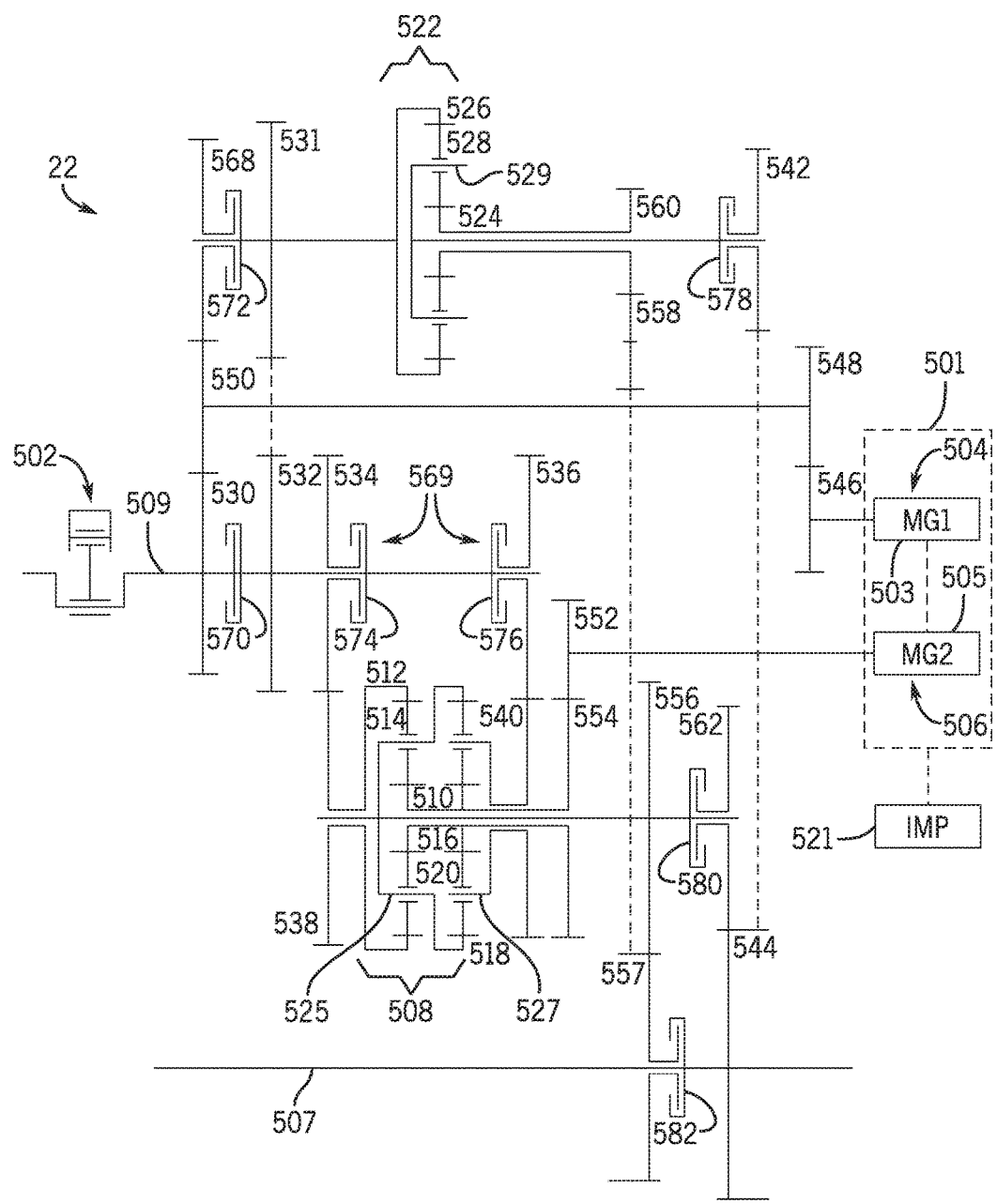
FIG. 12 is a schematic view of a powertrain related to that of FIG. 3, wherein the powertrain is shown in a first configuration.

The example embodiment illustrated in FIG. 12 will now be discussed in detail. As shown in FIG. 12, a powertrain 22 may include an engine 502, such as an internal combustion engine. The engine 502 may provide mechanical power directly to an engine shaft 509.

The powertrain 22 may additionally include an infinitely variable power (IVP) source 501, which may include at least one IVP machine. As shown in the illustrated embodiment, the IVP source 501 may include a first IVP machine 504 and a second IVP machine 506. In some embodiments, the first IVP machine 504 may comprise a first electric machine 503, and the second IVP machine 506 may include a second electric machine 505.

The powertrain 22 may further include a multi-mode infinitely variable transmission (MIVT), which is generally indicated at 515. The MIVT 515 may transmit mechanical power among the engine 502, the first electric machine 503, and the second electric machine 505 as will be discussed in detail below. The MIVT 515 may also transmit power to an output shaft 507. Power may be transmitted through the MIVT 515 along different paths, depending on the current transmission mode of the MIVT 515. The vehicle (e.g., the tractor of FIG. 1 or another work vehicle) may include wheels that are rotatably driven by the output shaft 507 (e.g., via one or more differentials).

As will be discussed, the first electric machine 503 may switch between a generator mode and a motor mode. In the generator mode, the first electric machine 503 may receive mechanical energy from the MIVT 515 and convert it into electrical energy that can be supplied to the second electric machine 505 and/or an implement 521. Conversely, in the motor mode, the first electric machine 503 may convert electric energy into mechanical energy that is supplied to the MIVT 515.

Likewise, the second electric machine 505 may switch between a motor mode and a generator mode. In the motor mode, the second electric machine 505 may convert electric energy into mechanical energy that is supplied to the MIVT 515. Conversely, in the generator mode, the second electric machine 505 may receive mechanical energy from the MIVT 515 and convert it into electrical energy that can be supplied to the first electric machine 503 and/or the implement 521.

The implement 521 may be a seeding implement, a shovel, a bucket, or other device. In some embodiments, the implement 521 may be powered by electrical energy supplied, at least in part, by the IVP 501. Also, the implement 521 may be mounted on-board the vehicle or may be remote and tethered to the vehicle, at least, by power cables.

The MIVT 515 may include a first planetary gearset 508. The first planetary gearset 508 may be a double planetary gearset including a plurality of transmission components. For example, the double planetary gearset may include a first sun gear 510, a first ring gear 512, a plurality of first planet gears 514 with an associated carrier 525, a second sun gear 516, a second ring gear 518, and a plurality of second planet gears 520 with an associated carrier 527. In some embodiments, the first sun gear 510, first ring gear 512, and first planet gears 514 may collectively comprise a so-called "LO gearset" of the first planetary gearset 508, and the second sun gear 516, second ring gear 518, and second planet gears 520 may collectively comprise a so-called "HI gearset" of the first planetary gearset 508. Also, the second ring gear 518 may be directly engaged for rotation with the carrier 525 of the first planet gears 514 in some embodiments.

The MIVT 515 may additionally include a second planetary gearset 522. The second planetary gearset 522 may be a single planetary gearset including a plurality of transmission components. For example, the single planetary gearset may include a sun gear 524, a ring gear 526, and a plurality of planet gears 528 with an associated carrier 529.

As will be discussed, in at least one mode of the MIVT 515, the power and torque output of the first planetary gearset 508 may be input to the second planetary gearset 522, and the second planetary gearset 522 may, in turn, provide power and/or torque to the output shaft 507 of the vehicle. In some embodiments, the powertrain 22 may provide powered-zero and/or creeper modes in this fashion.

The MIVT 515 may include a plurality of transmission components (e.g., gears, shafts, etc.) that is interconnected to transmit mechanical power through the MIVT 515. These components may be configured to transmit power among the engine 502, the first electric machine 503, the second electric machine 505, and ultimately to the output shaft 507. One or more of these transmission components may define a "transmission branch". In some embodiments, a first transmission branch may transmit power between the engine 502 and the first planetary gearset 508. Likewise, in some embodiments, a second transmission branch may transmit power between the first planetary gearset 508 and the second planetary gearset 522. Furthermore, in some embodiments, a third transmission branch may transmit power between the second planetary gearset 522 and the output shaft 507, and so on, as will be explained in detail below.

One or more transmission branches of the MIVT 515 may comprise a series of interconnected and/or enmeshed gears. The gears may be spur gears, bevel gears, or other types of gears. Also, two gears within a particular transmission branch may be enmeshed together (e.g., with parallel but spaced-apart axes of rotation). Furthermore, two gears within a particular transmission branch may be engaged for rotation with each other, and interconnected via a shaft(s) (e.g., with one or more shafts that are co-axial with the two gears in question).

In some embodiments, two shafts within a particular transmission branch may be engaged for rotation with each other and, alternatively, disengaged from each other. For example, a clutch may be included in the transmission branch and interposed between the two shafts. In a clutched position, the two shafts may be engaged for rotation with each other. In an unclutched position, the two shafts may be disengaged for independent rotation.

As shown in FIG. 12, the MIVT 515 may include a plurality of clutches 569. In some embodiments, the plurality of clutches 569 of the MIVT 515 include a first clutch 570, a second clutch 572, a third clutch 574, a fourth clutch 576, a fifth clutch 578, a sixth clutch 580, and seventh clutch 582. Each of these clutches 569 may operate independently and may actuate between a clutched position (i.e., engaged position, energized position, etc.) and, alternately, an unclutched position (i.e., disengaged position, deenergized position, etc.). In some embodiments, the clutches 569 are operably connected to respective ones of the transmission branches.

Different transmission branches of the MIVT 515 may transmit power at a given time depending on the mode of the MIVT 515. For each transmission mode, a predetermined subset of the plurality of clutches 570, 572, 574, 576, 578, 580, 582 may be engaged while the others may be disengaged. Different subsets of the clutches 570, 572, 574, 576, 578, 580, 582 may be engaged in the different modes. This allows power to be routed through the MIVT 515 in a variety of ways to supply the mechanical and electrical demands of the vehicle.

Figure 13:
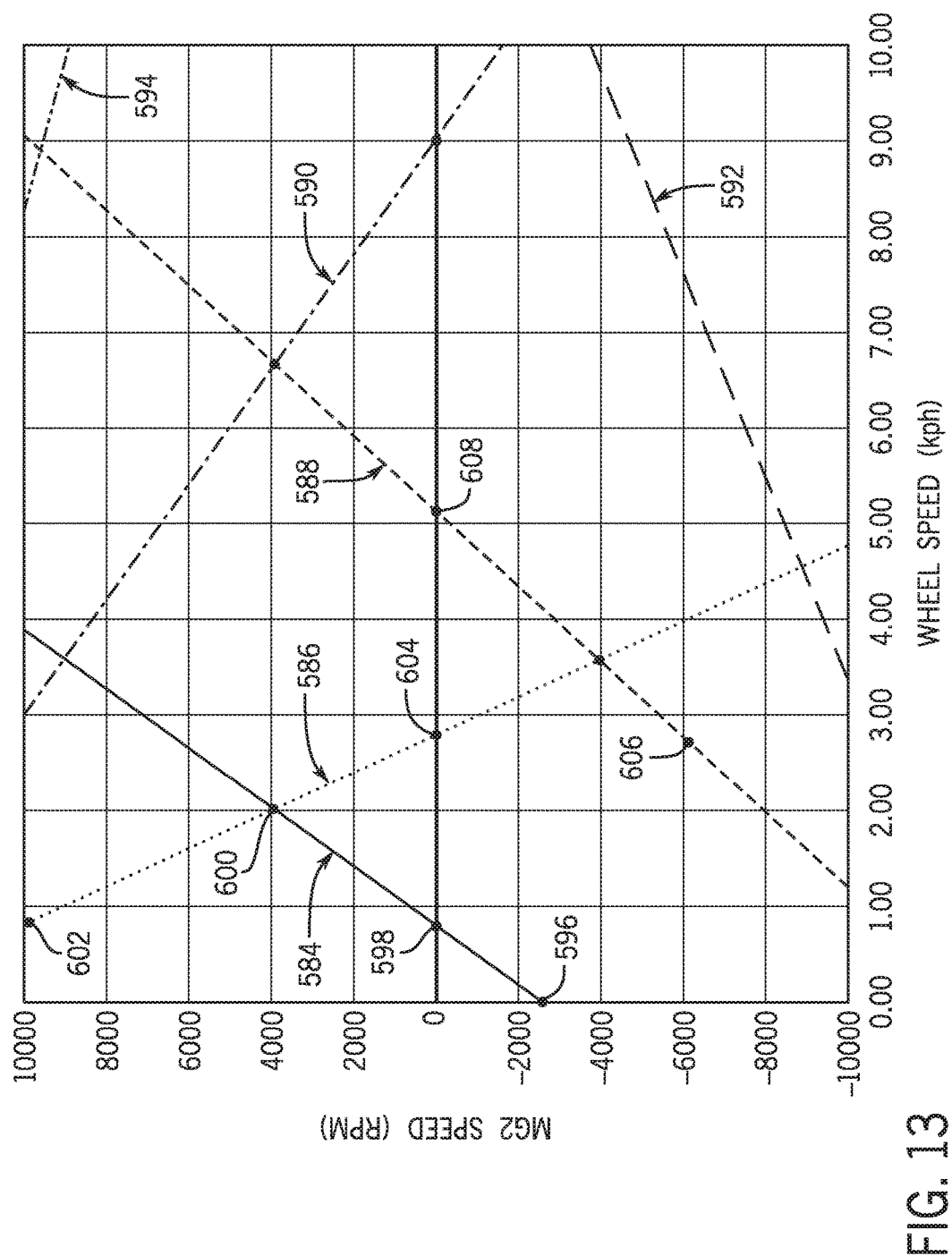
FIG. 13 is a graph representing the wheel speed of a vehicle versus a rotational speed of an electric machine of the powertrain of FIG. 12 for a given engine speed according to example embodiments of the present disclosure.

The different transmission modes of the MIVT 515 will now be discussed. FIG. 13 illustrates these different transmission modes according to an example embodiment of the present disclosure. Specifically, FIG. 13 illustrates a relationship between the wheel speed of the vehicle (X-axis) and the rotational speed of the second electric machine 505 (Y-axis). In some embodiments, the MIVT 515 may provide a first mode (represented by line 584 in FIG. 13), a second mode (represented by line 586), a third mode (represented by line 588), a fourth mode (represented by line 590), a fifth mode (represented by line 592), and a sixth mode (represented by line 594). These modes may represent forward modes of the vehicle, wherein the vehicle moves forward from a stationary position. The MIVT 515 may also include additional modes, such as at least one reverse mode, wherein the vehicle moves in the opposite, reverse direction from a stationary position.

In the first mode of the MIVT 515, the first clutch 570, the fourth clutch 576, and the fifth clutch 578 may be in the clutched position, and the other clutches 572, 574, 580, 582 may be in the unclutched position. As such, power (i.e., engine power) may be transmitted along a first transmission branch from the engine shaft 509 to the carrier 527 of the second planet gears 520 of the first planetary gearset 508. More specifically, power may be transmitted through this first transmission branch, from the engine shaft 509, through the first clutch 570, and through the fourth clutch 576 to a gear 536. The gear 536 is meshed with a gear 540, which is attached to the carrier 527 of the second planet gears 520. This first transmission branch may be a one-way power transmission path from the engine shaft 509 to the second planet gears 520 in some embodiments.

Additionally, in the first mode of the MIVT 515, a second transmission branch may be defined between the first electric machine 503 and the engine shaft 509 for transmission of power (i.e., IVP power transmission) therebetween. The second transmission branch may include a gear 546 that is engaged for rotation with a shaft of the first electric machine 503. The gear 546 may be enmeshed with a gear 548 that is mounted on opposite ends of a co-axial shaft with a gear 550. The gear 550 may be enmeshed with a gear 530. This second transmission branch may be a two-way power transmission path between the first electric machine 503 and the engine shaft 509. In other words, the first electric machine 503 may either: (a) operate in generator mode, receiving power from the gear 546 and converting it into electrical energy for supplying the implement 521, the second electric machine 505 or otherwise; or (b) operate in motor mode, supplying power to the gear 546 and, ultimately back to the first transmission branch discussed above. The direction of power transmission through this transmission branch may be controlled, for example, by controlling first electric machine 503 in some embodiments (i.e., by controlling the speed and rotation direction of the gear 546).

Also, in this first mode of the MIVT 515, a third transmission branch may be defined between the second sun gear 516 and the second electric machine 505 for transmission of power (i.e., IVP power transmission) therebetween. More specifically, power may be transmitted in either direction between the second sun gear 516 and the second electric machine 505 via a gear 554 and a gear 552, which are enmeshed with each other. As shown in FIG. 12, the gear 554 is engaged for rotation with the second sun gear 516, and the gear 552 is engaged for rotation with the second electric machine 505. This third transmission branch may be a two-way power transmission path between the second sun gear 516 and the second electric machine 505, meaning that the second electric machine 505 may either: (a) operate in motor mode and supply power toward the second sun gear 516; or (b) operate in generator mode, receiving mechanical power and converting it into electrical power that may be supplied to the first electric machine 503, the implement 521, or other electric power consumer. The direction of power transmission through this transmission branch may be controlled, for example, by controlling second electric machine 505 in some embodiments (i.e., by controlling the speed and rotation direction of the gear 552).

Additionally, a fourth transmission branch may be defined between the second ring gear 518 and the sun gear 524 of the second planetary gearset 522. More specifically, power (i.e., combined power) may be transmitted from the second ring gear 518, through the first planet gears 514, to a gear 556, which is enmeshed with a gear 557, which is enmeshed with a gear 558, and which is enmeshed with a gear 560. The gear 560 may be engaged for rotation with the sun gear 524 of the second planetary gearset 522. This fourth transmission branch may be a one-way power transmission path from the second ring gear 518 and the sun gear 524.

A fifth transmission branch in this first transmission mode may be defined from the ring gear 526 of the second planetary gearset 522 to the engine shaft 509. More specifically, power may be transmitted through this fifth transmission branch, from the ring gear 526, to a gear 531 that is engaged for rotation to the ring gear 526. The gear 531 may be engaged with a gear 532, and power may be transmitted from gear 532 back to the engine shaft 509. The gear 532 may be considered a flywheel. This fifth transmission branch may be a one-way power transmission path from the ring gear 526 to the engine shaft 509 in some embodiments.

Moreover, a sixth transmission branch may be defined from the planet gears 528 of the second planetary gearset to the output shaft 507. More specifically, power may be transmitted from the planet gears 528, through the clutch 578, to gear 542, which is enmeshed with gear 544, which is engaged for rotation with the output shaft 507. This sixth transmission branch may be a one-way transmission path from the planet gears 528 to the output shaft 507.

It will be appreciated that, in this first transmission mode, the first planetary gearset 508 and the second planetary gearset 522 both provide a split-path for power transmission within the MIVT 515. The first planetary gearset 508 combines input from the engine 502 and input/output of the second electric machine 505 such that output of the first planetary gearset 508 (i.e., first combined power) is input to the second planetary gearset 522. Also, the second planetary gearset 522 combines input from the first planetary gearset 508 and output to the engine shaft 509 such that output of the second planetary gearset 522 (i.e., second combined power) is output to the output shaft 507.

Furthermore, powered-zero may be achieved in this first transmission mode of the MIVT 515. Specifically, the combination at the second planetary gearset 522 may include the sun gear 524 receiving power input from the first planetary gearset 508 and the ring gear 526 outputting power toward the engine shaft 509, resulting in the carrier 529 of the planet gears 528 remaining stationary (i.e., zero rpm) while maintaining torque at the output shaft 507. Additionally, as shown in FIG. 13, the speed of the second electric machine 505 may be increased in the first mode to increase the wheel speed of the vehicle from the powered-zero state (i.e., creeper mode).

Additionally, in some embodiments, the first electric machine 503 and the second electric machine 505 may co-generate electricity simultaneously while in the powered-zero state and in the creeper mode. In the example of FIG. 13, for example, the powered-zero state may be represented at point 596, wherein the gear 552 of the second electric machine 505 is rotating in a first direction. The speed of the vehicle may be increased by decreasing the speed of the gear 552. In some embodiments, the second electric machine 505 may generate power from the powered-zero state (point 596) to the point at which the output speed of the gear 552 equals zero (point 598). At the same time, the first electric machine 503 may be in generator mode as well.

Assuming that the speed of the gear 552 begins rotating in the opposite direction and increases therefrom (from point 598 to point 600), the second electric machine 505 may enter motor mode such that the second electric machine 505 supplies power to the gear 552.

The second transmission mode is represented by line 586 in FIG. 13 according to example embodiments. In the second mode of the MIVT 515, the first clutch 570, the third clutch 574, and the fifth clutch 578 may be in the clutched position, and the other clutches 572, 576, 580, 582 may be in the unclutched position. As such, power may be transmitted along a first transmission branch from the engine shaft 509 to the first ring gear 512 of the first planetary gearset 508. More specifically, power may be transmitted through this first transmission branch, from the engine shaft 509, through the first clutch 570, and through the third clutch 574 to a gear 534. The gear 534 is meshed with a gear 538, which is attached to the ring gear 512. This first transmission branch may be a one-way power transmission path from the engine shaft 509 to the ring gear 512 in some embodiments.

Additionally, in this second transmission mode, the second transmission branch between the first electric machine 503 and the gear 530 may be substantially the same as discussed above.

Furthermore, the third transmission branch may be defined between the second electric machine 505 and the first sun gear 510 of the first planetary gearset 508. More specifically, power may be transmitted in either direction between the first sun gear 510 and the second electric machine 505 via enmeshed gear 552 and gear 554. This third transmission branch may be a two-way power transmission path between the first sun gear 510 and the second electric machine 505, meaning that the second electric machine 505 may either: (a) operate in motor mode and supply power toward the sun gear 510; or (b) operate in generator mode, receiving mechanical power and converting it into electrical power that may be supplied to the first electric machine 503, the implement 521, or other electric power consumer.

Additionally, a fourth transmission branch may be defined between the carrier 525 of the first planet gears 514 and the sun gear 524 of the second planetary gearset 522. More specifically, power may be transmitted from the first planet gears 514, to a gear 556, which is enmeshed with a gear 557, which is enmeshed with a gear 558, and which is enmeshed with a gear 560. The gear 560 may be engaged for rotation with the sun gear 524 of the second planetary gearset 522. This fourth transmission branch may be a one-way power transmission path from the second ring gear 518 to the sun gear 524.

Moreover, a fifth transmission branch in this second transmission mode may be defined from the ring gear 526 of the second planetary gearset 522 to the engine shaft 509. This fifth transmission branch may be configured as discussed above with relation to the first transmission mode.

Also, a sixth transmission branch may be defined from the planet gears 528 of the second planetary gearset to the output shaft 507. More specifically, power may be transmitted from the planet gears 528, through the clutch 578, to gear 542, which is enmeshed with gear 544, which is engaged for rotation with the output shaft 507. This sixth transmission branch may be a one-way transmission path from the planet gears 528 to the output shaft 507.

With reference to FIG. 13, the first and second electric machines 503, 505 may co-generate when the MIVT 515 is in this second transmission mode. This co-generation may occur when the speed of the gear 552 of second electric machine 505 is at speed represented by point 602 and as the speed of the gear 552 reduces toward zero at point 604. Then, as the speed of the gear 552 increases in the opposite direction, the second electric machine 505 may enter the motor mode.

It will be appreciated that the second electric machine 505 may remain in the generator mode from the powered-zero state in the first transmission phase through the lower output speed range of the second transmission phase (e.g., from point 596 to point 604 in FIG. 13). In one example sequence, the MIVT 515 may be in the powered-zero state (at point 596), and the MIVT 515 may remain in the first transmission mode as the wheel speed of the MIVT 515 increases. At point 598, the second electric machine 505 may remain in the generator mode by shifting the MIVT 515 into the second transmission phase (i.e., shift to point 602). The MIVT 515 may remain in the second transmission mode as the output speed increases. Accordingly, as shown in FIG. 13, there is sufficient overlap between the first transmission mode and the second transmission mode such that the second electric machine 505 may continuously remain in the generator mode from the first transmission mode to the second transmission mode.

The third transmission mode (i.e., first field mode) of the MIVT 515 may be represented by line 588 in FIG. 13. In the third transmission mode, the first clutch 570, the third clutch 574, and the sixth clutch 580 may be in the clutched position, and the other clutches 572, 576, 578, 582 may be in the unclutched position. As such, power may be transmitted along a first transmission branch from the engine shaft 509 to the first ring gear 512 of the first planetary gearset 508. More specifically, power may be transmitted through this first transmission branch, from the engine shaft 509, through the first clutch 570, and through the third clutch 574 to a gear 534. The gear 534 is meshed with a gear 538, which is attached to the ring gear 512. This first transmission branch may be a one-way power transmission path from the engine shaft 509 to the ring gear 512 in some embodiments.

Additionally, in this third transmission mode, the second transmission branch between the first electric machine 503 and the gear 530 may be substantially the same as discussed above with respect to the first and second transmission modes.

Furthermore, the third transmission branch between the second electric machine 505 and the first sun gear 510 may be substantially the same as discussed above with respect to the second transmission mode.

Moreover, the first planetary gearset 508 may combine power at the first ring gear 512 and the first sun gear 510 and output power from the first planet gears 514 to the output shaft 507. More specifically, in this fourth transmission branch, power may be transmitted from the first planet gears 514, through the sixth clutch 580, to a gear 562, which is enmeshed with a gear 544. The gear 544 may be engaged for rotation with the output shaft 507.

It will be appreciated that power transmission through the MIVT 515 bypasses the second planetary gearset 522 in this third transmission mode. In other words, power output from the first planetary gearset 508 is transmitted directly to the output shaft 507.

Also, it will be appreciated that the second electric machine 505 may be in generator mode from point 606 of FIG. 13 to point 608. Thus, assuming that the MIVT 515 is in the second transmission mode, the output speed continues to increase, and electrical demand is still high enough, the MIVT 515 may shift from the second transmission mode to the third transmission mode (i.e., by adjusting the speed of gear 552 from point 604 to point 606 in FIG. 13).

The fourth transmission mode (i.e., second field mode) of the MIVT 515 may be represented by line 590 in FIG. 13. In the fourth transmission mode, the first clutch 570, the fourth clutch 576, and the sixth clutch 580 may be in the clutched position, and the other clutches 572, 574, 578, 582 may be in the unclutched position. As such, power may be transmitted along a first transmission branch from the engine shaft 509 to the second planet gears 520 of the first planetary gearset 508. More specifically, power may be transmitted through this first transmission branch, from the engine shaft 509, through the first clutch 570, and through the fourth clutch 576 to gear 536. The gear 536 is meshed with gear 540, which is attached to the carrier 527 of the planet gears 520. This first transmission branch may be a one-way power transmission path from the engine shaft 509 to the second planet gears 520 in some embodiments.

Additionally, in this fourth transmission mode, the second transmission branch between the first electric machine 503 and the gear 530 may be substantially the same as discussed above with respect to the first, second, and third transmission modes.

Furthermore, the third transmission branch between the second electric machine 505 and the second sun gear 516 may be substantially the same as discussed above with respect to the first transmission mode.

Moreover, the first planetary gearset 508 may combine power of the second planet gears 520 and the second sun gear 516 and output power from the second ring gear 518 to the output shaft 507. More specifically, in this fourth transmission branch, power may be transmitted from the second ring gear 518, through the first planet gears 514, through the sixth clutch 580, to the gear 562, and ultimately to the gear 544 for rotating the output shaft 507.

The fifth transmission mode (i.e., third field mode) of the MIVT 515 may be represented by line 592 in FIG. 13. In the fifth transmission mode, the first clutch 570, the third clutch 574, and the seventh clutch 582 may be in the clutched position, and the other clutches 572, 576, 578, 580 may be in the unclutched position. As such, power may be transmitted along a first transmission branch from the engine shaft 509 to the first ring gear 512 of the first planetary gearset 508, similar to the first transmission branch defined in the first transmission mode.

Additionally, in this fifth transmission mode, the second transmission branch between the first electric machine 503 and the gear 530 may be substantially the same as discussed above with respect to the first, second, and third transmission modes.

Furthermore, the third transmission branch between the second electric machine 505 and the first sun gear 510 may be substantially the same as discussed above with respect to the second and third transmission modes.

Moreover, the first planetary gearset 508 may combine power of the first ring gear 512 and the first sun gear 510 and output power from the second planet gears 514 to the output shaft 507. More specifically, in this fourth transmission branch, power may be transmitted from the carrier 525 of the first planet gears 514 to the gear 556, which is enmeshed with the gear 557 for rotating the output shaft 507.

The sixth transmission mode (i.e., fourth field mode) of the MIVT 515 may be represented by line 594 in FIG. 13. In the sixth transmission mode, the first clutch 570, the fourth clutch 576, and the seventh clutch 582 may be in the clutched position, and the other clutches 572, 574, 578, 580 may be in the unclutched position. As such, power may be transmitted along a first transmission branch from the engine shaft 509 to the second planet gears 520 of the first planetary gearset 508, similar to the first transmission branch defined in the fourth transmission mode.

Additionally, in this sixth transmission mode, the second transmission branch between the first electric machine 503 and the gear 530 may be substantially the same as discussed above with respect to the first, second, third, fourth and fifth transmission modes.

Furthermore, the third transmission branch between the second electric machine 505 and the second sun gear 516 may be substantially the same as discussed above with respect to the fourth transmission mode.

Moreover, the first planetary gearset 508 may combine power of the second planet gears 520 and the second sun gear 516 and output power from the second ring gear 518 to the output shaft 507. More specifically, in this fourth transmission branch, power may be transmitted from the second ring gear 518, through the first planet gears 514, through the sixth clutch 580, to the gear 562, and ultimately to the gear 544 for rotating the output shaft 507.

The MIVT 515 may also include one or more reverse modes. The reverse modes may be similar to the first, second, third, fourth, fifth, and sixth reverse modes described above, except that the second clutch 572 is clutched instead of the first clutch 570 in each mode.

Thus, as an example first reverse mode, the second clutch 572, the fourth clutch 576, and the fifth clutch 578 are clutched and the other clutches 570, 574, 580, 582 remain unclutched. As such, power is transmitted from the engine shaft 509, through the second clutch 572 (i.e., the reverser clutch), to the second planet gears 520 of the first planetary gearset 508. Specifically, power is transmitted from the engine shaft 509, to gear 530, which is enmeshed with gear 550, which is enmeshed with gear 568. This power is transferred through the second clutch 572 to gear 531, which is enmeshed with the gear 532. This power is transmitted through the fourth clutch 576 to gear 536, which is enmeshed with the gear 540, and ultimately to the second planet gears 520. The other transmission branches may be the same as described above with respect to the first transmission mode. Other reverse transmission modes may be configured similarly (i.e., similar to the modes described in detail below, except that the second clutch 572 is clutched instead of the first clutch 570 in each).

Figure 14:
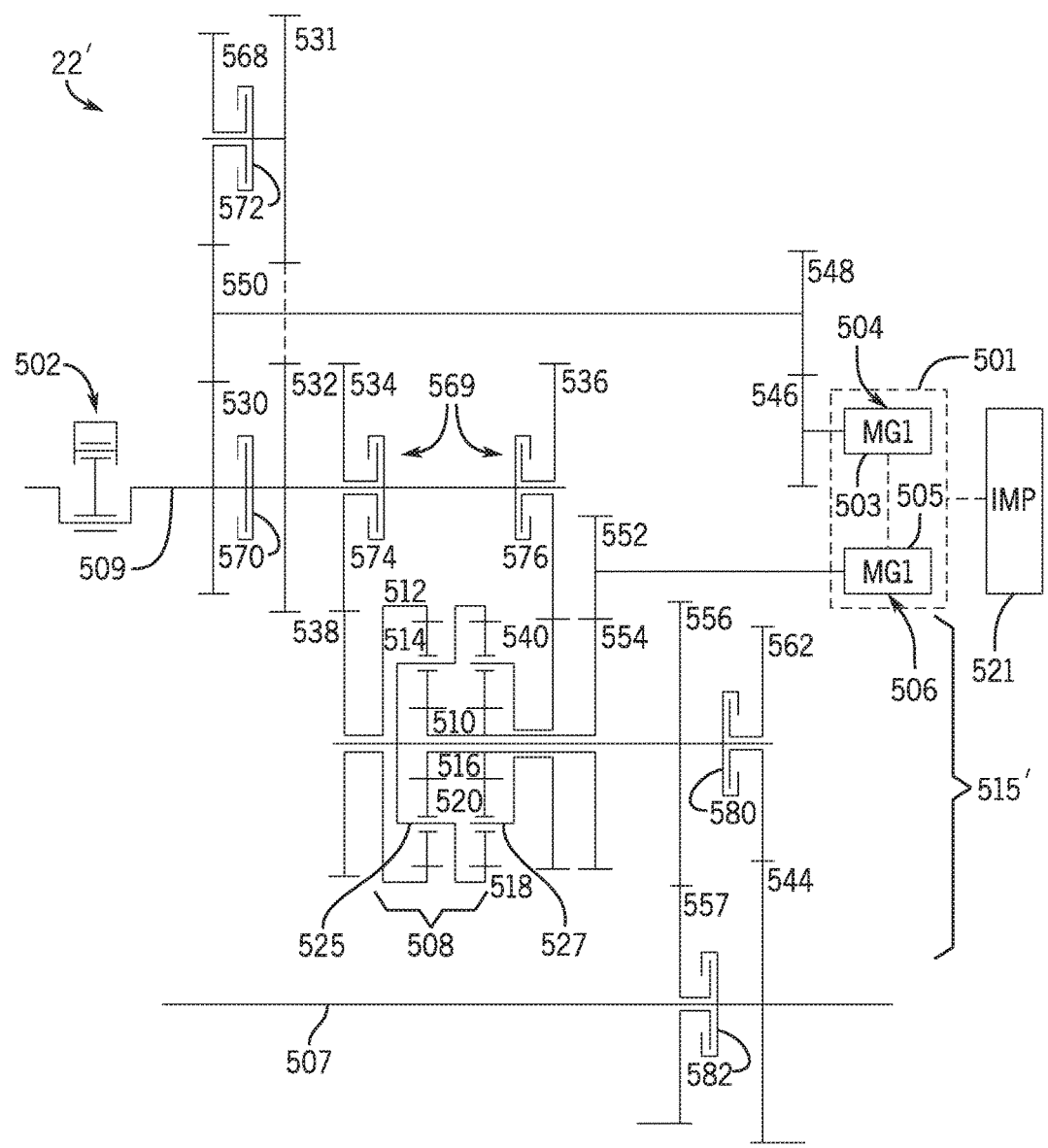
FIG. 14 is a schematic view of the powertrain of FIG. 12 shown in a second configuration.

Referring now to FIG. 14, certain modular features of the powertrain 22' and the MIVT 515' will be discussed in detail. The powertrain 22' and MIVT 515' of FIG. 14 may have a modular configuration that is different from the modular configuration of the MIVT 515 embodied in FIG. 12.

As shown, the MIVT 515' may be substantially similar to the MIVT 515 of FIG. 12, except the second planetary gearset 522 of FIG. 12 and associated gears 542, 558, and 560, and the fifth clutch 578 may be omitted in the configuration of FIG. 14.

In some embodiments, the MIVT 515' may have the third mode, the fourth mode, the fifth mode, and the sixth mode. These modes may correspond, respectively, to the third, fourth, fifth, and sixth modes as described above.

The first and second modes (powered-zero and creeper modes) as described above would be unavailable to the MIVT 515' of FIG. 14. This is because the planetary gearset 508 combines the engine power provided by the engine 502 and the second MIVP 501 as discussed above. The combined output power is transmitted from the gearset 508 directly to the output shaft 507. This contrasts with the configuration of FIG. 12, wherein the combined output power from the first planetary gearset 508 is delivered to the second planetary gearset 522, which splits the input power between the output shaft 507 and gear 532.

Thus, the modular configuration of the MIVT 515' of FIG. 14 does not provide the powered-zero, co-generation capabilities of the MIVT 515 of FIG. 12. However, for some vehicles and/or some customers, this capability may not be necessary. Also, the modular configuration of FIG. 14 may be more compact than that of FIG. 12 because it includes fewer parts. Thus, a first work vehicle may be built to include the modular configuration of FIG. 14, and a second work vehicle may be built to include the modular configuration of FIG. 12, depending on the type of work to be performed by the vehicle, the space constraints within the vehicle, and/or other considerations.

Figure 15:
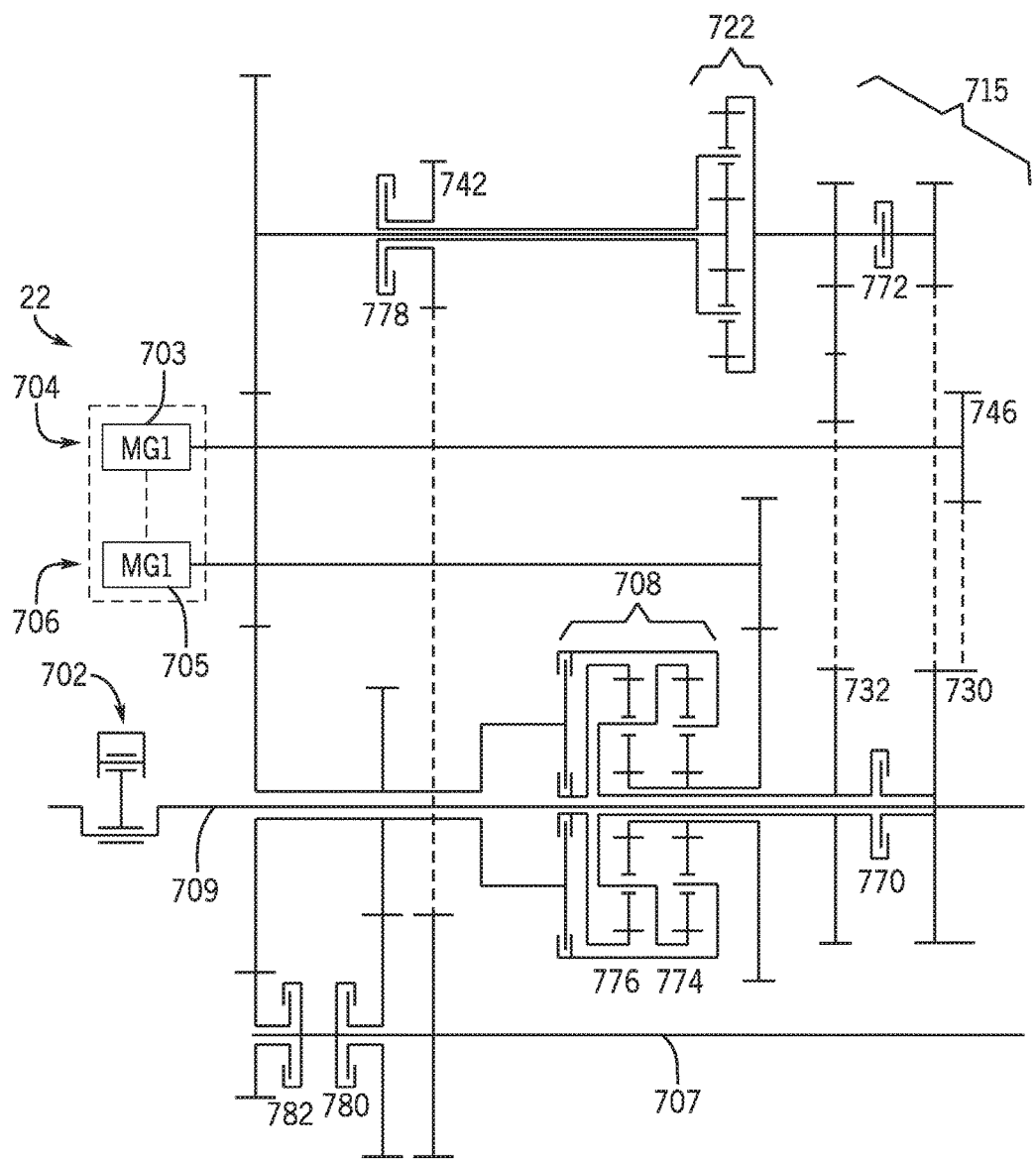
FIG. 15 is a schematic view of a powertrain related to that of FIG. 12, wherein the powertrain is shown in a first configuration.

Referring now to FIG. 15, additional embodiments of the MIVT 715 will be discussed according to example embodiments. The MIVT 715 may be substantially similar to the embodiment of the MIVT 515 of FIG. 12 in several respects. Therefore, common features will not be explained again. Also, components in FIG. 15 that correspond to those of FIG. 12 will be identified with corresponding reference numbers increased by 200.

The MIVT 715 may differ from the embodiment of FIG. 12 in that the engine shaft 709 may be substantially coaxial with the central axis of first planetary gearset 708. In other respects, the MIVT 715 may be similar to the embodiment of FIG. 12. For example, the MIVT 715 may have the six forward transmission modes and at least one reverse transmission mode using the same clutching patterns discussed above with respect to the embodiment of FIG. 12.

The embodiment of FIG. 15 may be configured for work vehicles with certain space constraints and/or particular architectures. For example, the embodiment of FIG. 15 may be useful for "short-drop" work vehicles—those with the engine 702 relatively low and disposed rearward toward the cab of the work vehicle. In contrast, the embodiment of FIG. 12 may be useful for "long-drop" work vehilces—those with engines 502 relatively high and disposed over the front axle.

Figure 16:
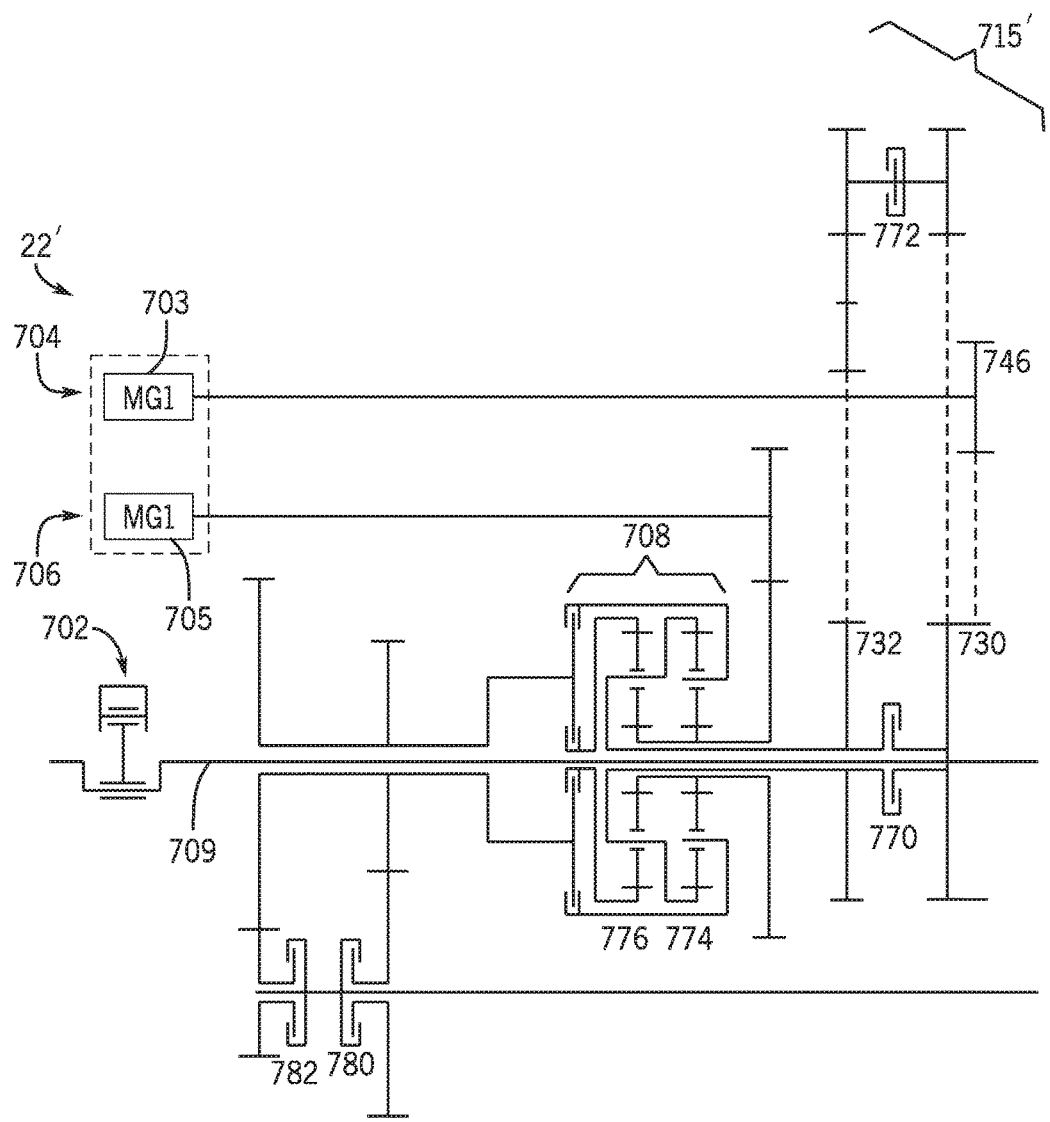
FIG. 16 is a schematic view of the powertrain of FIG. 15 shown in a second configuration.

Referring now to FIG. 16, a second modular configuration of the MIVT 715' is shown. As shown, the MIVT 715' may be substantially similar to the MIVT 715 of FIG. 15, except the second planetary gearset 722 of FIG. 15, the associated gears, and the fifth clutch 778 may be omitted in the configuration of FIG. 14. Thus, the embodiment of FIG. 16 does not provide the powered-zero, co-generation capabilities of the MIVT 715 of FIG. 15. However, as explained above with respect to FIG. 14, this capability may not be necessary for some vehicles. Also, the MIVT 715' of FIG. 16 may be more compact than the MIVT 715 of FIG. 15. Accordingly, the MIVT 715' of FIG. 16 may be useful in a vehicle with particular space constraints.

Referring now to FIG. 17-20, the present disclosure will be discussed according to additional example embodiments. These embodiments may correspond to the embodiments discussed above and/or shown in FIGS. 1-16. It should be noted that the schematic representation of the powertrain shown in FIGS. 17-20 illustrate example implementations in simplified form for clarity, and thus may not depict all of the components associated with the represented powertrains.

As will be discussed, the powertrain of the present disclosure provides a multi-mode infinitely variable transmission (IVT) that transmits power and torque provided by an engine (e.g., a diesel engine) and an IVP to one or more output shafts. In some embodiments, the IVT may have a plurality of transmission modes. At least one mode may be a serial mode, and at least one other mode may be a split-path mode.

The IVT may be configured to provide substantially seamless shifting between its different modes. In a sense, the IVT may be configured for continuously handing off torque from one engageable transmission member to another to shift between the different transmission modes. More specifically, in some embodiments, the IVT may include various engageable transmission members (e.g., clutches, synchronizers, dog collars, etc.). The engageable transmission members may have different arrangements for the different transmission modes: some of the members may be engaged while others may be disengaged for a particular transmission mode, and the arrangement of engaged and disengaged members may be different for the different transmission modes. During a shift between transmission modes, one engageable member may disengage while another engages to complete a shift between transmission modes. As the disengaged member moves toward the engaged position, its components may already be rotating at approximately the same angular speed. Thus, the components may engage seamlessly to complete the shift. As such, the shift may be imperceptible to the vehicle operator. Also, loads on the transmission components may be relatively low. This seamless shifting may also increase fuel efficiency for the vehicle.

Additionally, the IVT may be packaged in a compact fashion. For example, in some embodiments, multiple gears may be supported on a common shaft to make the powertrain more compact. Furthermore, one gear may function as a driver gear in one transmission mode and may function as an idler gear in another transmission mode, and this alternative functionality may allow the IVT to be relatively compact. The IVT may also have various layouts to correspond with the available space within the vehicle.

Moreover, the IVT of the present disclosure may incorporate substantially similar parts for use at two different locations within the assembly. For example, the two different gears may be included in the IVT at two different locations and may be employed alternatively depending on the current transmission mode. These gears may include the same number of teeth and/or other dimensions. The similarity of these gears may increase manufacturing efficiency when producing the power train of the present disclosure.

Figure 17:
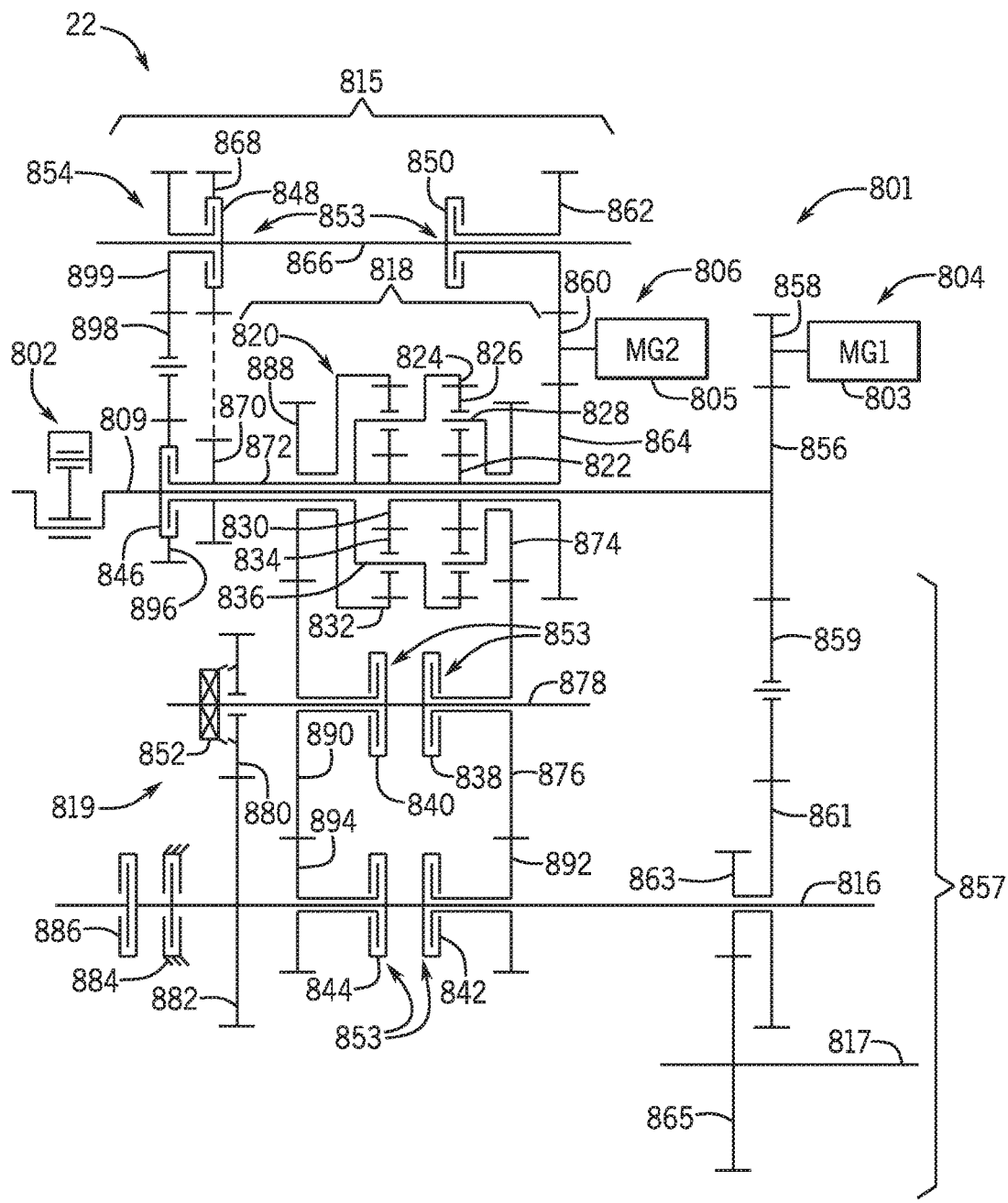
FIG. 17 is a schematic view of a powertrain related to that of FIG. 5, wherein the powertrain is shown in a first configuration.

The example embodiment illustrated in FIG. 17 will now be discussed in detail. As shown in FIG. 17, a powertrain 22 may include an engine 802, such as an internal combustion engine. The engine 802 may provide mechanical power directly to an engine shaft 809.

The powertrain 22 may additionally include an infinitely variable power source (IVP) 801, which may include at least one IVP machine. As shown in the illustrated embodiment, the IVP 801 may include a first IVP 804 and a second IVP 806. In some embodiments, the first IVP 804 may comprise a first electric machine 803, and the second IVP 806 may include a second electric machine 805. Although not specifically shown, it will be appreciated that the first and second electric machines 803, 805 may be electrically connected such that one may generate electricity and supply electricity for powering the other.

The powertrain 22 may further include a multi-mode infinitely variable transmission (MIVT), which is generally indicated at 815. As will become apparent, the MIVT 815 may include one or more features discussed above, such as those included in the embodiment of FIG. 5. The MIVT 815 may transmit mechanical power among the engine 802, the first electric machine 803, and the second electric machine 805 as will be discussed in detail below. The MIVT 815 may also transmit power to a first output shaft 816. In some embodiments, the first output shaft 816 may be an axle that rotates to ultimately drive the wheels of the vehicle (e.g., the wheels of the tractor of FIG. 1).

The MIVT 815 may have a plurality of modes. Power may be transmitted through the MIVT 815 along different paths, depending on the current transmission mode of the MIVT 815.

The MIVT 815 may include a variator 818. As will be discussed, the variator 818 may be operably attached to the engine 802, the first electric machine 803, and the second electric machine 805. Depending on the currently mode of the MIVT 815, the variator 818 may output power from one or more of these components.

In some embodiments, the variator 818 may include a compound planetary gearset, such as a double planetary gearset 820, which is operably connected to the engine 802, the first electric machine 803, and the second electric machine 805. As will be discussed in detail, the variator 818 may, in some modes, combine power delivered from the engine 802 and at least one of the first and second electric machines 803, 805. This combined power may ultimately be delivered to the first output shaft 816 (i.e., split-path mode). Moreover, in some modes, the variator 818 may transmit power that is delivered from only one of the engine 802, the first electric machine 803, and the second electric machine 805 to the first and/or second electric machines 803, 805 (i.e., serial mode).

The double planetary gearset 820 may include a plurality of transmission components. For example, the double planetary gearset may include a first sun gear 822, a first ring gear 824, a plurality of first planet gears 826 with an associated carrier 828, a second sun gear 830, a second ring gear 832, and a plurality of second planet gears 834 with an associated carrier 836. In some embodiments, the first sun gear 822, the first ring gear 824, and first planet gears 826 may collectively comprise a so-called "LO-gearset" of the double planetary gearset 820, and the second sun gear 830, the second ring gear 832, and the second planet gears 834 may collectively comprise a so-called "HI-gearset" of the double planetary gearset 820. Also, the first ring gear 824 may be directly engaged for rotation with the carrier 836 of the second planet gears 834 in some embodiments. The double planetary gearset 820 may also correspond in various ways to the double planetary gearset 100 of FIG. 5 in some embodiments.

The MIVT 815 may also include a plurality of other transmission components (e.g., gears, shafts, clutches, synchronizers, etc.) that are operably connected to the double planetary gearset 820 and that are configured to transmit power among the engine 802, the first electric machine 803, the second electric machine 805, and ultimately to the output shaft 816. There may include a series of gears, shafts, clutches, synchronizers, etc. arranged in various geartrains for power transfer in the various modes of the MIVT 815.

Some of these components (e.g., clutches, synchronizers, dog collars, etc.) may be operable for selectively shifting the MIVT 815 between its various modes. For example, the MIVT 815 may include a forward clutch 846, a reverse clutch 848, a first clutch 850, a second clutch 838, a third clutch 840, a fourth clutch 842, a fifth clutch 844, and a synchronizer 852. These components will be collectively referred to as "engageable transmission members" and will be identified generally with reference number 853. Each of the engageable transmission members 853 may independently actuate between an engaged position (i.e., energized, clutched, or closed position) and, alternatively, a disengaged position (i.e. deenergized, unclutched, or open position, etc.).

The MIVT 815 may transmit power along a path that depends on the current mode of the MIVT 815. For each transmission mode, a predetermined subset of the engageable transmission members 853 may be engaged while the others are disengaged. This allows power to be routed through the MIVT 815 in a variety of ways to supply the mechanical and electrical demands of the vehicle.

In some embodiments, the forward clutch 846, the reverse clutch 848, and the first clutch 850 may be part of a reverser assembly 854 of the MIVT 815. The reverser assembly 854 may include a plurality of gears and shafts as well. Accordingly, in some embodiments, the reverser assembly 854 may include a plurality of gears, such as spur gears that are arranged in one or more gear trains. In other embodiments, such as the embodiment of FIG. 5, the reverser assembly may comprise a planetary gearset, such as the planetary gearset 98, and one or more clutches (e.g., clutch 112 and clutch 114).

Referring back to FIG. 17, the reverser assembly 854 may be configured to route power between the engine 802, the first electric machine 803, the second electric machine 805, and the variator 818. In some embodiments, the reverser assembly 854 may be configured for selective power flow that propels the vehicle forward or backward. Moreover, in some embodiments, the reverser assembly 854 may be employed during a serial mode (e.g., a serial creeper mode) for the MIVT 815 as will be discussed.

Also, in some embodiments, the second, third, fourth, and fifth clutches 838, 840, 842, 844 and the synchronizer 852 may be part of a gear box 819 (i.e., a range box) of the MIVT 815. The gear box 819 may include various shafts and gears (e.g., spur gears, bevel gears, etc.) that are arranged in one or more geartrains. In some embodiments, the gear box 819 may receive power output from the variator 818 and supply the power to the output shaft 816.

The plurality of modes of the MIVT 815 will now be discussed. Various shafts and gears and details about the engageable transmission members 853 will be discussed in relation to the various transmission modes and in explaining power flow through the MIVT 815. Forward modes will be discussed in detail initially, and reverse modes will be discussed as well.

The MIVT 815 may include a first transmission mode. In the first transmission mode, the first clutch, the second clutch, and the synchronizer 850, 838, 852 may be in the engaged position, and the other engageable transmission members 853 may be in the disengaged position. The first transmission mode may be a serial mode (e.g., a serial electric mode) in some embodiments.

In the first transmission mode, the power from the engine 802 may be supplied to the engine shaft 809 and transferred to a first gear 856. This engine power may then transfer to a second gear 858, which is directly engaged to a shaft of the first electric machine 803. Accordingly, in some embodiments, the engine 802 may power the first electric machine 803. The first electric machine 803 may, in turn, operate as a generator, and provide electric power to the second electric machine 805 in some conditions.

Also, in some embodiments, the first gear 856 may be enmeshed with a PTO geartrain 857 for transferring power from the engine 802 and/or first electric machine 803 to a second output shaft 817. The second output shaft 817 may be used to ultimately deliver off-board power, for example, to a vehicle or implement that is towed by the tractor of FIG. 1. The second output shaft 817 may be referred to as a power take-off shaft. In some embodiments, a work implement (e.g., a seeder, etc.) may be powered by the second output shaft 817.

The PTO geartrain 857 may include a first PTO gear 859, which is enmeshed with the first gear 856 and with a second PTO gear 861. The second PTO gear 861 may be directly engaged to a coaxial third PTO gear 863. The third PTO gear 863 may be enmeshed with a fourth PTO gear 865. The fourth PTO gear 865 may be fixed to the second output shaft 817. Accordingly, power from the engine 802 and/or first electric machine 803 may flow to the second output shaft 817 via the PTO geartrain 857.

Additionally, in this first transmission mode, the second electric machine 805 may output mechanical power to drive a third gear 860. The third gear 860 may be enmeshed with a fourth gear 862 and a fifth gear 864. A component (e.g., a friction plate, etc.) of the first clutch 850 may be directly engaged to the fourth gear 862. Another component (e.g., an opposing friction plate, etc.) of the first clutch 850 may be directly engaged to a first shaft 866. A sixth gear 868 may be fixed and supported on the first shaft 866 as well. The sixth gear 868 may be enmeshed with a seventh gear 870, which is fixedly supported on a second shaft 872. In some embodiments, the second shaft 872 may be hollow and may receive the engine shaft 809. The second shaft 872 may be directly engaged with the fifth gear 864 as well as the first sun gear 822, the second sun gear 830, and the carrier 836 of the second planet gears 834.

Accordingly, in the first transmission mode, mechanical power from the second electric machine 805 may output to the third gear 860 and split between the fourth gear 862 and the fifth gear 864. As such, power may be provided to the first sun gear 822 (via the fifth gear 864 and the second shaft 872) and to the first ring gear 824 (via the fourth gear 862, the first clutch 850, the first shaft 866, the sixth gear 868, the seventh gear 870, the second shaft 872, and the carrier 836). This power may recombine at the first planet gears 826.

The first planet gears 826 may output this recombined power via the carrier 828 to an eighth gear 874. The eighth gear 874 may be enmeshed with a ninth gear 876. The ninth gear 876 may be coaxial with and may be supported for rotation on a third shaft 878. A component of the second clutch 838 may be directly engaged to the ninth gear 876, and another component of the second clutch 838 may be directly engaged to the third shaft 878. Moreover, when in the engaged position, the synchronizer 852 may selectively engage a tenth gear 880 to the third shaft 878. The tenth gear 880 may also be enmeshed with an eleventh gear 882. The eleventh gear 882 may be fixed to the first output shaft 816. Accordingly, the recombined power (provided from the second electric machine 805 via the variator 818) may flow from the carrier 828 to the eighth gear 874, to the ninth gear 876, along the third shaft 878 (via the second clutch 838 and synchronizer 852) to the tenth gear 880, to the eleventh gear 882 and to the output shaft 816. As stated above, this power may be delivered to the wheels of the vehicle.

In some embodiments, at least one brake 884 may be operably mounted on the first output shaft 816 for selective braking of the first output shaft 816. Also, a front axle engage clutch 886 may be operably mounted on the first output shaft 816 for selectively providing power to the wheels of a front axle of the vehicle.

In a second transmission mode of the MIVT 815, the forward clutch 846, the second clutch 838, and the synchronizer 852 may be in the engaged position and the other engageable transmission members 853 may be in the disengaged position. This mode may be a split-path mode.

Power from the engine 802 and engine shaft 809 may transfer via the forward clutch 846 to the second shaft 872 to drive the ring gear 824 of the variator 818. Also, the engine shaft 809 may provide power to the first electric machine 803 (via the first and second gears 856, 858). Moreover, in this second transmission mode, mechanical power from the second electric machine 805 may flow (via the gears 860, 864 and shaft 872) to the sun gear 822 of the variator 818.

As a result, power from the engine 802 and the second electric machine 805 may be summed at the planet gears 826 and carrier 828 of the variator 818. As explained above, this power may flow to the first output shaft 816 (via the eighth gear 874, ninth gear 876, the third shaft 878, the second clutch 838, the synchronizer 852, the tenth gear 880, and the eleventh gear 882).

In a third transmission mode of the MIVT 815, the forward clutch 846, the third clutch 840, and the synchronizer 852 may be engaged and the other engageable transmission members 853 may be in the disengaged position. This mode may be a split-path mode.

Power from the engine 802 and the engine shaft 809 may transfer via the forward clutch 846 to the second shaft 872 to drive the carrier 836 and the associated planet gears 834. Also, the engine shaft 809 may provide power to the first electric machine 803 (via the first and second gears 856, 858). Moreover, in this third transmission mode, mechanical power from the second electric machine 805 may flow (via the gears 860, 864 and shaft 872) to the sun gear 830 of the variator 818.

As a result, power from the engine 802 and the second electric machine 805 may be summed at the ring gear 832 of the variator 818. A twelfth gear 888 may be directly engaged with the second ring gear 832, and the twelfth gear 888 may be enmeshed with a thirteenth gear 890. A component of the third clutch 840 may be directly engaged with the thirteenth gear 890, and another component of the third clutch 840 may be fixed to the third shaft 878. Accordingly, with the third clutch 840 engaged, power from the thirteenth gear 890 may transfer to the tenth gear 880 and via the synchronizer 852 to the output shaft 816.

In a fourth transmission mode of the MIVT 815, the forward clutch 846, the second clutch 838, and the fourth clutch 842 may be engaged, and the other engageable transmission members 853 may be in the disengaged position. This mode may be a split-path mode.

Power from the engine 802 and engine shaft 809 may transfer via the forward clutch 846 to the second shaft 872 to drive the first ring gear 824 of the variator 818. Also, the engine shaft 809 may provide power to the first electric machine 803 (via the first and second gears 856, 858). Moreover, in this fourth transmission mode, mechanical power from the second electric machine 805 may flow (via the gears 860, 864 and shaft 872) to the first sun gear 822 of the variator 818.

As a result, power from the engine 802 and the second electric machine 805 may be summed at the planet gears 826 of the variator 818 and the associated carrier 828. This power may flow to the eighth gear 874, the ninth gear 876, through the second clutch 838 to the third shaft 878 to rotate the ninth gear 876. The ninth gear may be enmeshed with a fourteenth gear 892. A component of the fourth clutch 842 may be directly connected to the fourteenth gear 892. Another component of the fourth clutch 842 may be directly connected to the output shaft 816. Accordingly, with the fourth clutch 842 engaged in this fourth transmission mode, power may be ultimately delivered from the fourteenth gear 892 to the output shaft 816.

In a fifth transmission mode of the MIVT 815, the forward clutch 846, the third clutch 840, and the fifth clutch 844 may be engaged, and the other engageable transmission members 853 may be in the disengaged position. This mode may be split-path mode.

Power from the engine 802 and the engine shaft 809 may transfer via the forward clutch 846 to the second shaft 872 to drive the carrier 836 and the associated planet gears 834. Also, the engine shaft 809 may provide power to the first electric machine 803 (via the first and second gears 856, 858). Moreover, in this fifth transmission mode, mechanical power from the second electric machine 805 may flow to the sun gear 830 of the variator 818.

As a result, power from the engine 802 and the second electric machine 805 may be summed at the ring gear 832 of the variator 818. This power may be transferred to the twelfth gear 888 and to the thirteenth gear 890. The thirteenth gear 890 may be enmeshed with a fifteenth gear 894. A component of the fifth clutch 844 may be directly connected to the fifteenth gear 894. Another component of the fifth clutch 844 may be directly connected to the output shaft 816. Accordingly, with the fifth clutch 844 engaged in this fifth transmission mode, power may be ultimately delivered from the fifteenth gear 894 to the output shaft 816.

The MIVT 815 may also have one or more reverse modes. In some embodiments, the reverse modes may be provided similar to the second, third, fourth, and fifth modes discussed above, except that the reverse clutch 848 may be engaged instead of the forward clutch 846.

Thus, in one reverse mode (corresponding to the second transmission mode described above), the reverse clutch 848, the second clutch 838, and the synchronizer 852 may be engaged and the other engageable transmission members 853 may be disengaged. Accordingly, power from the engine 802 and engine shaft 809 may rotate a sixteenth gear 896. The sixteenth gear 896 may be enmeshed with a seventeenth gear 898, and the seventeenth gear 898 may be enmeshed with an eighteenth gear 899. A component of the reverse clutch 848 may be directly engaged with the eighteenth gear 899. Another component of the reverse clutch 848 may be directly engaged with the sixth gear 868. Thus, with the reverse clutch 848 engaged, power from the engine 802 may flow to the sixth gear 868 to the seventh gear 870 and to the ring gear 824 (via the carrier 836). Power flow from the second electric machine 805 into the variator 818 and from the variator 818 to the output shaft 816 may be substantially similar as described above with respect to the second transmission mode.

Shifts between these various modes may be achieved substantially seamlessly. For example, as one engageable transmission member 853 disengages, another engageable transmission member 853 may engage without having to change relative speeds between components.

For example, when shifting from the first (serial creeper) mode to the second (split-path field) mode, the first clutch 850 may disengage and the forward clutch 846 may engage. Just before the forward clutch 846 engages, the second shaft 872 may be rotating at approximately the same angular speed as the engine shaft 809. (At this point, power flows to the second shaft 872 via the engaged first clutch 850.) Since the second shaft 872 and the engine shaft 809 are substantially synchronous, the forward clutch 846 may engage seamlessly (and the first clutch 850 may disengage) to complete the shift from the first mode to the second mode.

When shifting from the second mode to the third mode, the second clutch 838 may disengage and the third clutch 840 may engage. Just before the third clutch 840 engages, the thirteenth gear 890 may be rotating at approximately the same angular speed as the third shaft 878. (At this point, power flows to the thirteenth gear 890 via the ring gear 832 of the variator 818, and power flows to the third shaft 878 via the engaged second clutch 838.) Since the thirteenth gear 890 and the third shaft 878 are substantially synchronous, the third clutch 840 may engage seamlessly (and the second clutch 838 may disengage) to complete the shift from the second mode to the third mode.

When shifting from the third mode to the fourth mode, the third clutch 840 and the synchronizer 852 may disengage, and the second clutch 838 may engage and the fourth clutch 842 may engage as well. In some embodiments, the fourth clutch 842 may engage soon after the second clutch 838 engages. Just before the second clutch 838 engages, the ninth gear 876 and the third shaft 878 may be rotating at approximately the same angular speed. (At this point, power flows to the ninth gear 876 via the carrier 828 of the variator 818, and power flows to the third shaft 878 via the third clutch 840.) Moreover, just before the fourth clutch 842 engages, the fourteenth gear 892 and the output shaft 816 may be rotating at approximately the same angular speed. (At this point, power flows to the fourteenth gear 892 via the second clutch 838, and power flows to the output shaft 816 via the third clutch 840 and synchronizer 852.) Since the ninth gear 876 and the third shaft 878 are substantially synchronous and the fourteenth gear 892 and the output shaft 816 are substantially synchronous, the second and fourth clutches 838, 842 may engage seamlessly (and the third clutch 840 and synchronizer 852 may disengage) to complete the shift from the third mode to the fourth mode.

Additionally, when shifting from the fourth mode to the fifth mode, the second clutch 838 and the fourth clutch 842 may disengage, and the third clutch 840 and the fifth clutch 844 may engage as well. In some embodiments, the fifth clutch 844 may engage soon after the third clutch 840 engages. Just before the third clutch 840 engages, the thirteenth gear 890 and the third shaft 878 may be rotating at approximately the same angular speed. (At this point, power flows to the thirteenth gear 890 via the ring gear 832 of the variator 818, and power flows to the third shaft 878 via the second clutch 838.) Moreover, just before the fifth clutch 844 engages, the fifteenth gear 894 and the output shaft 816 may be rotating at approximately the same angular speed. (At this point, power flows to the fifteenth gear 894 via the third clutch 840, and power flows to the output shaft 816 via the fourth clutch 842.) Since the thirteenth gear 890 and the third shaft 878 are substantially synchronous and the fifteenth gear 894 and the output shaft 816 are substantially synchronous, the third and fifth clutches 840, 844 may engage seamlessly (and the second and fourth clutches 838, 842 may disengage) to complete the shift from the fourth mode to the fifth mode.

In some embodiments, the graph of FIG. 6 may represent two or more transmission modes of the IVT 815. The line 150 may represent the first mode (creeper mode), line 152 may represent the second mode, and line 154 may represent the third mode. In some embodiments, the point of intersection of line 150 and 152 may represent the conditions at which the IVT 815 shifts seamlessly between the first mode and the second mode. Likewise, the point of intersection of line 152 and line 154 may represent the conditions at which the IVT 815 shifts seamlessly between the second mode and the third mode.

It will be appreciated that the seamless shifting described above may occur when shifting modes in the opposite direction as well. For example, the MIVT 815 may shift from the fifth mode to the fourth mode in a way that is opposite the above-described shift from the fourth mode to the fifth mode. Similarly, the shifts from fourth mode to third mode, third mode to second mode, and second mode to first mode may be achieved opposite to the descriptions included above.

The IVT 815 may provide various advantages. For example, the seamless shifting may improve ride quality and fuel efficiency. Also, loads on the transmission components may be reduced due to the seamless shifting.

Furthermore, the IVT 815 may be relatively compact. For example the engine shaft 809 may be coaxial with the second shaft 872 to reduce the size of the IVT 815. Also, the forward clutch 846 and the variator 818 may be coaxial with the engine shaft 809. The first clutch 850 and the reverse clutch 848 may also be operably mounted on the same shaft (i.e., the first shaft 866). Similarly, the second clutch 838 and the third clutch 840 may both be operably mounted on the same shaft (i.e., the third shaft 878. Likewise, the fourth clutch 842 and the fifth clutch 844 may both be operably mounted on the same shaft (i.e., the output shaft 816), making the IVT 815 relatively compact.

Additionally, the function of some components may differ, depending on the current transmission mode. For example, the ninth gear 876 may operate as a traction gear to rotate the shaft 878 in the first and second transmission modes; however, the ninth gear 876 may operate as an idler gear in the fourth transmission mode for rotating the downstream fourteenth gear 892. Likewise, the thirteenth gear 890 may operate as a traction gear to rotate the third shaft 878 in the third mode; however, the thirteenth gear 890 may operate as an idler gear in the fifth transmission mode for rotating the downstream fifteenth gear 894. For these reasons, the IVT 815 may be relatively compact and efficient.

Moreover, the IVT 815 may include multiple gears that share common features. For example, in some embodiments, the eighth gear 874 may be substantially similar to the twelfth gear 888. In some embodiments, the eighth gear 874 and the twelfth gear 888 may include the same number of teeth, may have the same diameter, and/or may include other similar features. Also, in some embodiments, the ninth gear 876 and the thirteenth gear 890 may be substantially similar. Furthermore, in some embodiments, the fourteenth gear 892 and the fifteenth gear 894 may be substantially similar. These part redundancies may allow the IVT 815 to be manufactured in an efficient manner.

Figure 18:
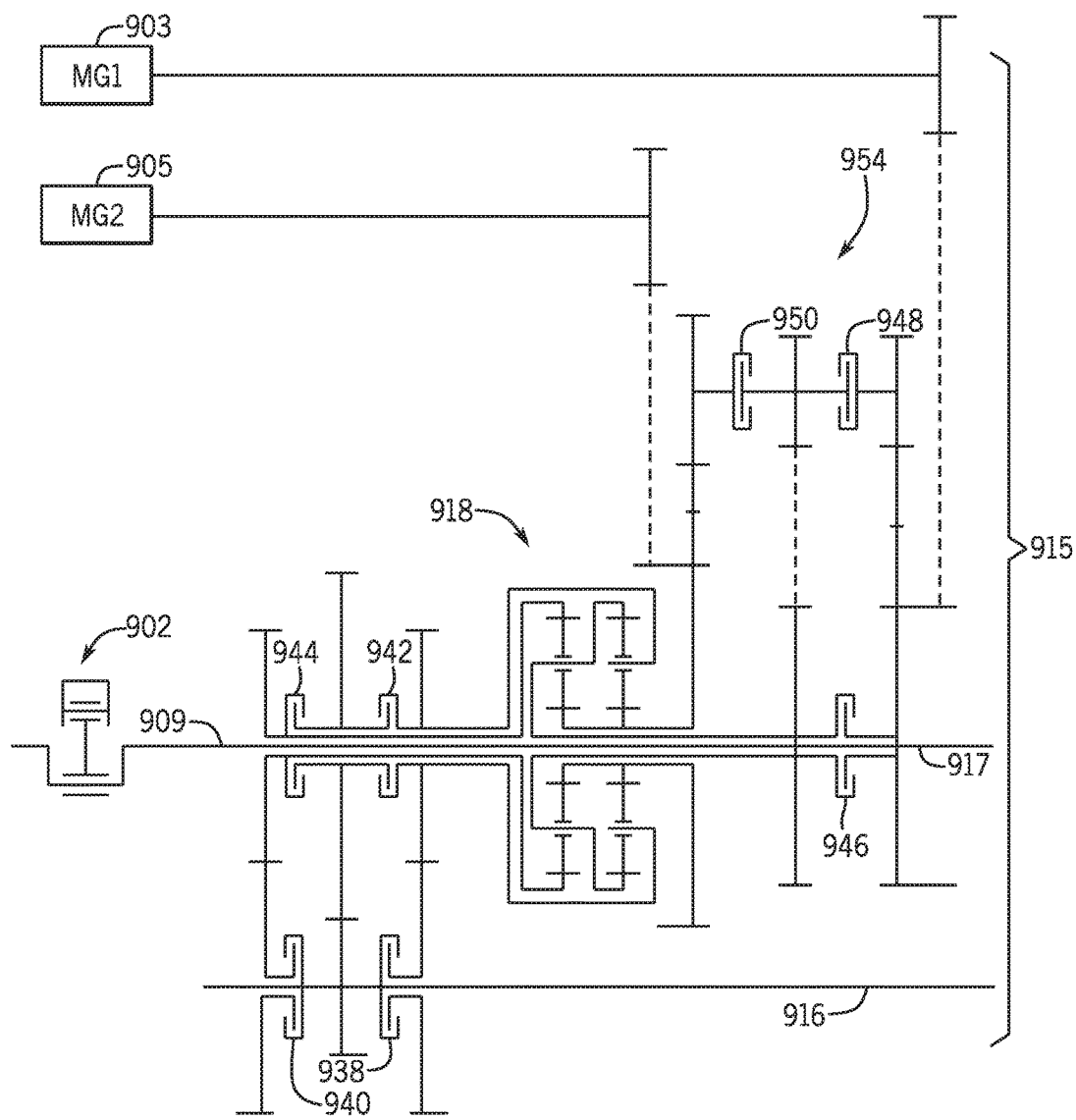
FIG. 18 is a schematic view of the powertrain of FIG. 17 shown in a second configuration.
Figure 19:
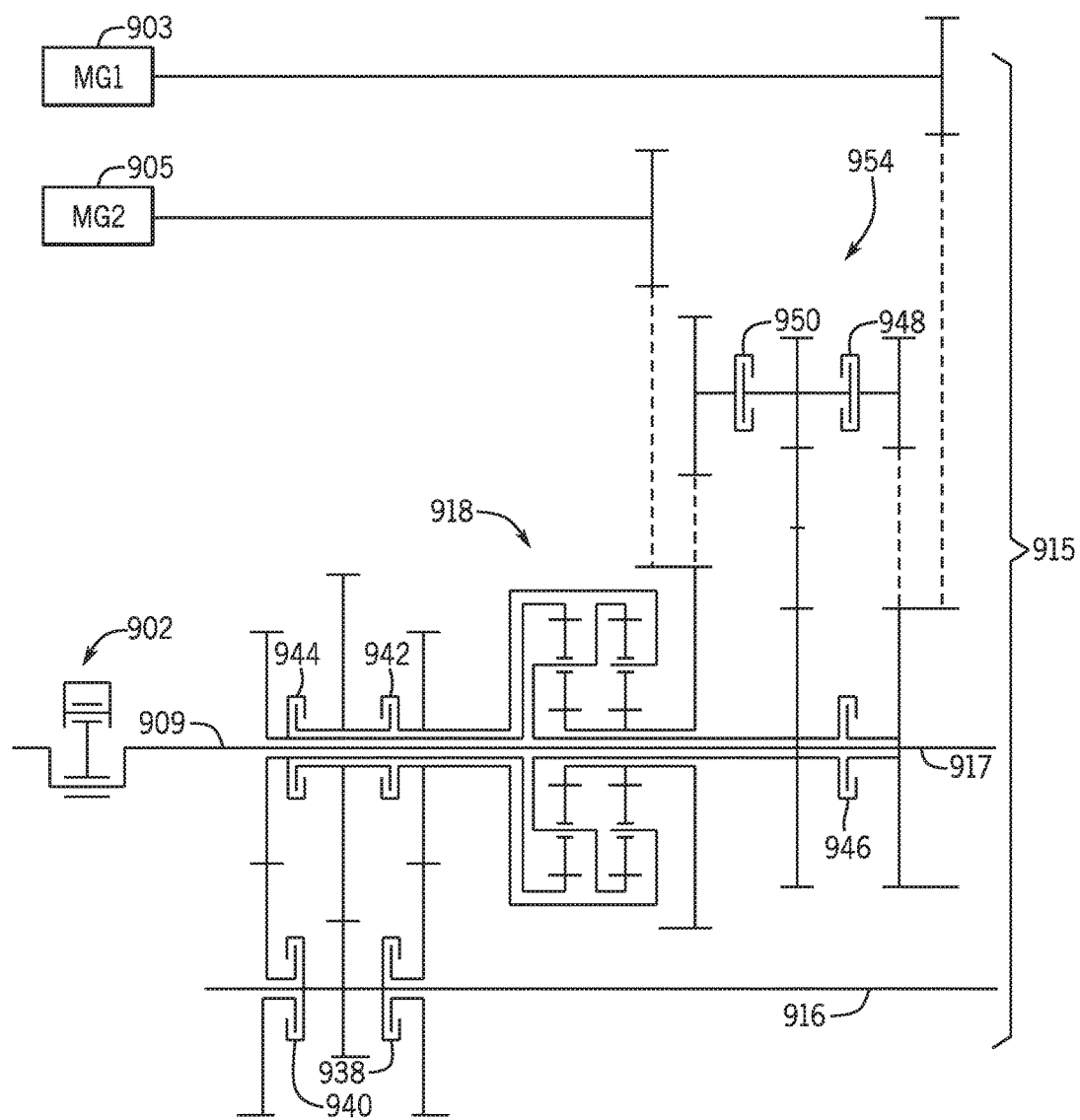
FIG. 19 is a schematic view of the powertrain of FIG. 17 shown in a third configuration.

Referring now to FIGS. 18 and 19, the MIVT 915 will be discussed according to additional embodiments. The MIVT 915 may be substantially similar to the MIVT 815 of FIG. 17 except as shown and described below. Components of the MIVT 915 that are similar to those of the embodiment of FIG. 17 are illustrated with corresponding reference numbers increased by 100.

The MIVT 915 may include the variator 918, the forward clutch 946, the reverse clutch 948, the first clutch 950, the second clutch 938, the third clutch 940, the fourth clutch 942, and the fifth clutch 944. As shown in the embodiment of FIGS. 18 and 19, the fourth clutch 942 and the fifth clutch 944 may be substantially coaxial with the engine shaft 909. Also, the MIVT 915 of FIG. 18 may be substantially similar to the MIVT 915 of FIG. 19 except for differences in the arrangement of gears included in the reverser assembly 954.

Like the embodiment of FIG. 17, the MIVT 915 may transmit power from the engine 902, the first electric machine 903, and/or the second electric machine 905 to the first output shaft 916. In some embodiments, the MIVT 915 may also transmit power from the engine 902, the first electric machine 903, and/or the second electric machine 905 to the second output shaft 917.

The transmission modes may be substantially similar to those discussed above with respect to FIG. 17. Specifically, in a first transmission mode, the first clutch 950 and the second clutch 938 may be engaged and the others may be disengaged. This may be a serial mode in which power from the engine 902 is supplied to the first electric machine 903, and power from the second electric machine 905 is supplied to the variator 918. The variator 918, in turn, outputs power from the second electric machine 905 to the first output shaft 916 via the second clutch 938. The MIVT 915 may also include various split-path modes, including the second mode (forward clutch 946 and second clutch 938 engaged), the third mode (forward clutch 946 and third clutch 940 engaged), the fourth mode (forward clutch 946 and fourth clutch 942 engaged), and the fifth mode (forward clutch 946 and fifth clutch 944 engaged).

Figure 20:
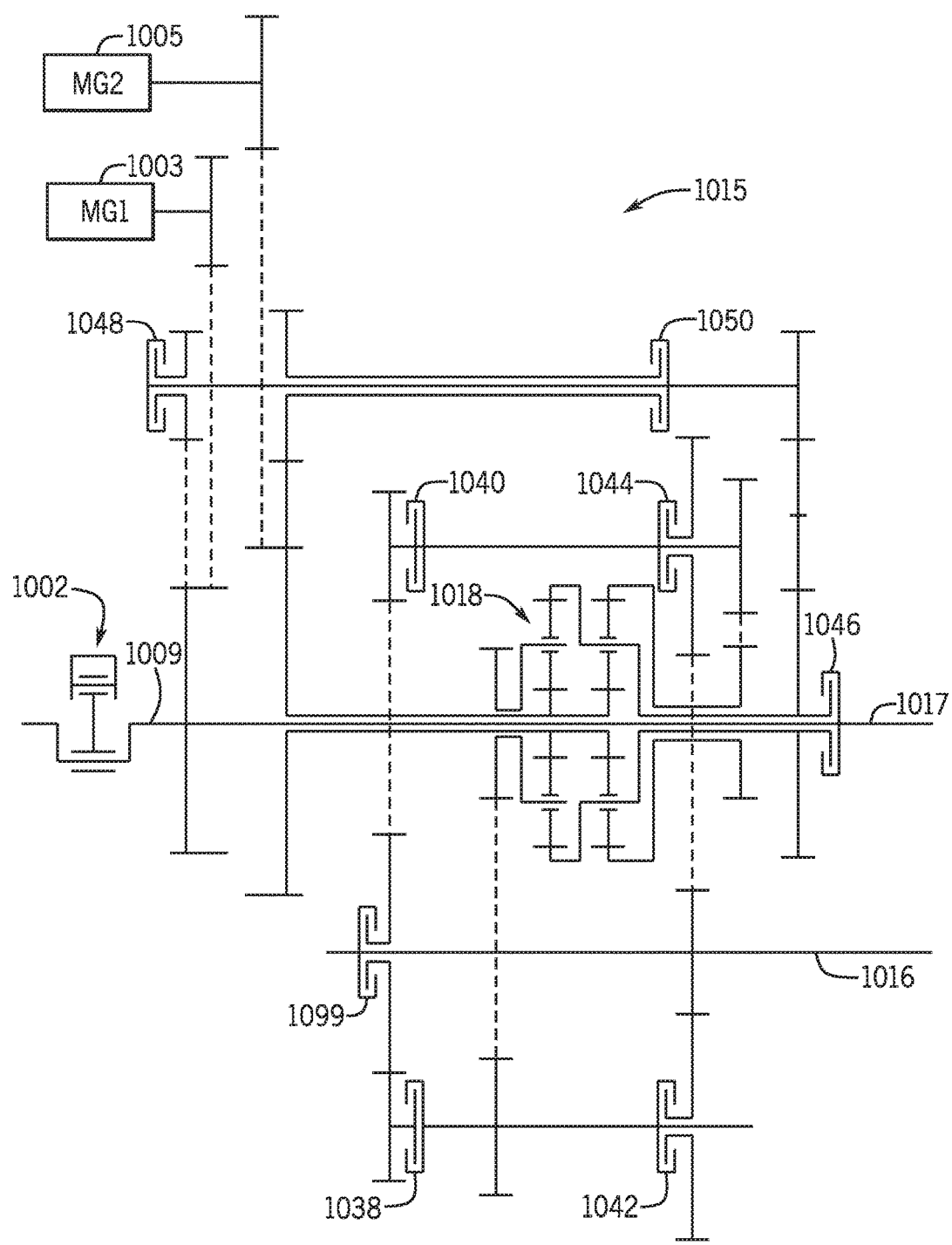
FIG. 20 is a schematic view of the powertrain of FIG. 17 shown in a fourth configuration.

Referring now to FIG. 20, the MIVT 1015 of the present disclosure is illustrated according to additional embodiments. The MIVT 1015 may be substantially similar to the MIVT 815 of FIG. 17 except as shown and described below. Components of the MIVT 1015 that are similar to those of the embodiment of FIG. 17 are illustrated with corresponding reference numbers increased by 200.

The MIVT 1015 may include the variator 1018, the forward clutch 1046, the reverse clutch 1048, the first clutch 1050, the second clutch 1038, the third clutch 1040, the fourth clutch 1042, and the fifth clutch 1044. The MIVT 1015 may also include a sixth clutch 1099 instead of the synchronizer 852 of the embodiment of FIG. 17.

Like the embodiment of FIG. 17, the MIVT 1015 may transmit power from the engine 1002, the first electric machine 1003, and/or the second electric machine 1005 to the first output shaft 1016. In some embodiments, the MIVT 1015 may also transmit power from the engine 1002, the first electric machine 1003, and/or the second electric machine 1005 to the second output shaft 1017.

The transmission modes may be substantially similar to those discussed above with respect to FIG. 17. Specifically, in a first transmission mode, the first clutch 1050, the second clutch 1038, and the sixth clutch 1099 may be engaged and the others may be disengaged. This may be a serial mode in which power from the engine 1002 is supplied to the first electric machine 1003, and power from the second electric machine 1005 is supplied to the variator 1018. The variator 1018, in turn, outputs power from the second electric machine 1005 to the first output shaft 1016. The MIVT 1015 may also include various split-path modes, including the second mode (forward clutch 1046, second clutch 1038, and sixth clutch 1099 engaged), the third mode (forward clutch 1046, third clutch 1040, and sixth clutch 1099 engaged), the fourth mode (forward clutch 1046, second clutch 1038, and fourth clutch 1042 engaged), and the fifth mode (forward clutch 1046, third clutch 1040, and fifth clutch 1044 engaged).

Figure 21:
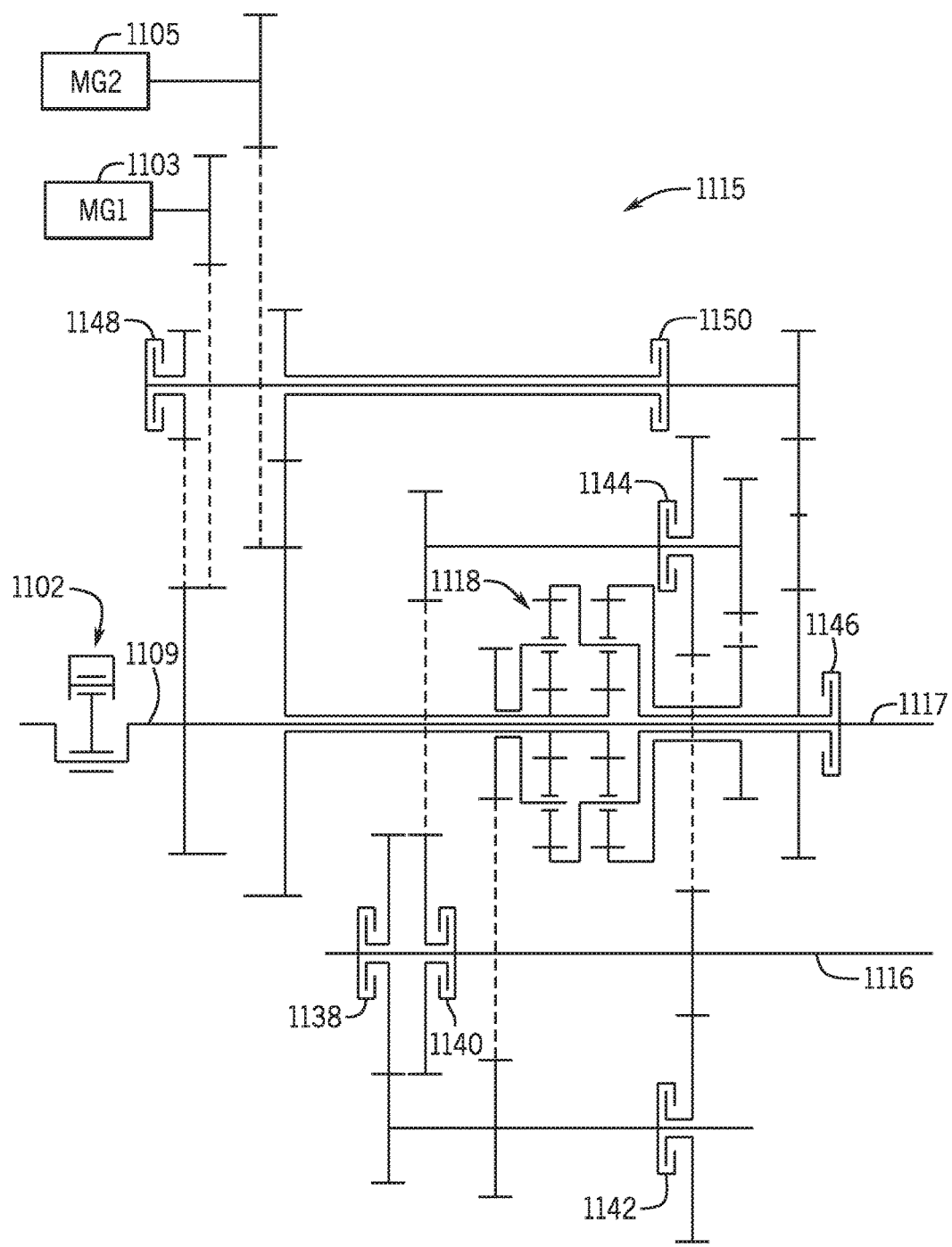
FIG. 21 is a schematic view of the powertrain of FIG. 17 shown in a fifth configuration.

Referring now to FIG. 21, the MIVT 1115 of the present disclosure is illustrated according to additional embodiments. The MIVT 1115 may be substantially similar to the MIVT 815 of FIG. 17 except as shown and described below. Components of the MIVT 1115 that are similar to those of the embodiment of FIG. 17 are illustrated with corresponding reference numbers increased by 300.

The MIVT 1115 may include the variator 1118, the forward clutch 1146, the reverse clutch 1148, the first clutch 1150, the second clutch 1138, the third clutch 1140, the fourth clutch 1142, and the fifth clutch 1144. Like the embodiment of FIG. 17, the MIVT 1115 may transmit power from the engine 1102, the first electric machine 1103, and/or the second electric machine 1105 to the first output shaft 1116. In some embodiments, the MIVT 1015 may also transmit power from the engine 1102, the first electric machine 1103, and/or the second electric machine 1105 to the second output shaft 1117.

The transmission modes may be substantially similar to those discussed above with respect to FIG. 17. Specifically, in a first transmission mode, the first clutch 1150 and the second clutch 1138 may be engaged and the others may be disengaged. This may be a serial mode in which power from the engine 1102 is supplied to the first electric machine 1103, and power from the second electric machine 1105 is supplied to the variator 1118. The variator 1118, in turn, outputs power from the second electric machine 1105 to the first output shaft 1116. The MIVT 1115 may also include various split-path modes, including the second mode (forward clutch 1146 and second clutch 1138 engaged), the third mode (forward clutch 1146 and third clutch 1140 engaged), the fourth mode (forward clutch 1146 and fourth clutch 1142 engaged), and the fifth mode (forward clutch 1146 and fifth clutch 1144 engaged).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. A work vehicle comprising:
   an engine;
   at least one infinitely variable power source (IVP);
   an output shaft; and
   an infinitely variable transmission (IVT) that includes a variator, the IVT configured to shift between a plurality of transmission modes, the IVT configured to transmit power from at least one of the engine and the IVP to the output shaft in the plurality of transmission modes;
   wherein the plurality of transmission modes includes at least one serial mode and at least one split-path mode;
   wherein, in the serial mode, the variator receives engine power from the engine and IVP power from the at least one IVP, and the variator outputs recombined power from the at least one IVP;
   wherein, in the split-path mode, the variator receives engine power from the engine and IVP power from the at least one IVP, and the variator outputs combined power from the IVP and the engine;

wherein the IVT includes an engageable transmission member that is configured to move between an engaged position and a disengaged position;

wherein the engageable transmission member includes a first component and a second component, the first and second components being rotatably engaged in the engaged position, the first and second components being disengaged in the disengaged position;

wherein the plurality of transmission modes includes a first mode and a second mode;

wherein the IVT is configured to shift from the first mode to the second mode, at least in part, by moving the engageable transmission member from the disengaged position to the engaged position, the first and second components configured to rotate at approximately the same angular speed as the engageable transmission member moves from the disengaged position to the engaged position;

wherein the IVT is configured such that power is delivered to one of the first and second components during the first mode, before the shift from the first mode to the second mode;

wherein the engageable transmission member is a first engageable transmission member;

wherein the IVT includes a second engageable transmission member;

wherein the second engageable transmission member is in an engaged position in the first mode and a disengaged position in the second mode; and wherein the second engageable transmission member transfers power to the one of the first and second components during the first mode.

2. The work vehicle of claim 1, wherein the first engageable transmission member and the second engageable transmission member are operably supported on a common shaft.

3. The work vehicle of claim 1, wherein the IVT includes a first gear configured to transfer power to the first engageable transmission member;

wherein the IVT includes a second gear configured to transfer power to the second engageable transmission member; and wherein the first and second gear have the same number of teeth.

4. The work vehicle of claim 1, wherein the variator includes a double planetary gearset.

5. The work vehicle of claim 1, wherein the engageable transmission member is configured to receive power from the variator.

6. The work vehicle of claim 1, wherein the first mode is the serial mode and the second mode is the split-path mode.

7. A work vehicle comprising:
an engine;
at least one infinitely variable power source (IVP);
an output shaft; and
an infinitely variable transmission (IVT) that includes a variator, the IVT configured to shift between a plurality of transmission modes, the IVT configured to transmit power from at least one of the engine and the IVP to the output shaft in the plurality of transmission modes;
wherein the plurality of transmission modes includes at least one serial mode and at least one split-path mode;
wherein, in the serial mode, the variator receives engine power from the engine and IVP power from the at least one IVP, and the variator outputs recombined power from the at least one IVP;
wherein, in the split-path mode, the variator receives engine power from the engine and IVP power from the at least one IVP, and the variator outputs combined power from the IVP and the engine;
wherein the IVT includes an engageable transmission member that is configured to move between an engaged position and a disengaged position;
wherein the engageable transmission member includes a first component and a second component, the first and second components being rotatably engaged in the engaged position, the first and second components being disengaged in the disengaged position;
wherein the plurality of transmission modes includes a first mode and a second mode;
wherein the IVT is configured to shift from the first mode to the second mode, at least in part, by moving the engageable transmission member from the disengaged position to the engaged position, the first and second components configured to rotate at approximately the same angular speed as the engageable transmission member moves from the disengaged position to the engaged position;
wherein the IVT includes a reverser assembly that is configured to route power between the engine, the at least one IVP, and the variator; and
wherein the reverser assembly is configured to provide the serial mode of the IVT.

8. The work vehicle of claim 7, wherein the reverser assembly includes a plurality of spur gears and shafts arranged in a gear train.

9. The work vehicle of claim 7, wherein the reverser assembly includes a planetary gearset.

10. A work vehicle comprising:
an engine;
at least one infinitely variable power source (IVP);
an output shaft; and
an infinitely variable transmission (IVT) that includes a variator, the IVT configured to shift between a plurality of transmission modes, the IVT configured to transmit power from at least one of the engine and the IVP to the output shaft in the plurality of transmission modes;
wherein the plurality of transmission modes includes at least one serial mode and at least one split-path mode;
wherein, in the serial mode, the variator receives engine power from the engine and IVP power from the at least one IVP, and the variator outputs recombined power from the at least one IVP;
wherein, in the split-path mode, the variator receives engine power from the engine and IVP power from the at least one IVP, and the variator outputs combined power from the IVP and the engine;
wherein the IVT includes an engageable transmission member that is configured to move between an engaged position and a disengaged position;
wherein the engageable transmission member includes a first component and a second component, the first and second components being rotatably engaged in the engaged position, the first and second components being disengaged in the disengaged position;
wherein the plurality of transmission modes includes a first mode and a second mode;
wherein the IVT is configured to shift from the first mode to the second mode, at least in part, by moving the engageable transmission member from the disengaged position to the engaged position, the first and second components configured to rotate at approximately the same angular speed as the engageable transmission member moves from the disengaged position to the engaged position; and wherein the first mode is a first split-path mode, and the second mode is a second split-path mode.

11. A method of operating an infinitely variable transmission (IVT) for transferring power from an engine and at least one infinitely variable power source (IVP) to an output shaft, the method comprising:
- operating the IVT in a serial mode in which a variator of the IVT receives engine power from the engine and IVP power from the at least one IVP, and the variator outputs recombined power from the at least one IVP;
- operating the IVT in a split-path mode in which the variator receives engine power from the engine and IVP power from the at least one IVP, and the variator outputs combined power from the at least one IVP and the engine;
- shifting from a first mode to a second mode of the plurality of transmission modes of the IVT;
- wherein shifting from the first mode to the second mode includes moving an engageable transmission member from a disengaged position to an engaged position;
- wherein the engageable transmission member includes a first component and a second component, the first and second components being rotatably engaged in the engaged position, the first and second components being disengaged in the disengaged position;
- wherein shifting from the first mode to the second mode includes rotating the first and second components at approximately the same angular speed as the engageable transmission member moves from the disengaged position to the engaged position;
- wherein the engageable transmission member is a first engageable transmission member, and wherein the IVT includes a second engageable transmission member;
- wherein shifting from the first mode to the second mode includes disengaging the second engageable transmission member; and
- wherein power is delivered to one of the first and second components during the first mode, before shifting from the first mode to the second mode;
- wherein power is transferred, via the second engageable transmission member, to the one of the first and second components during the first mode.

12. The method of claim 11, wherein power is transferred from the second engageable transmission member to a shaft that operably supports both the first and second engageable transmission members.

13. The method of claim 11, wherein the variator is a double planetary gearset.

14. The method of claim 11, further comprising transferring power from the variator to the engageable transmission member.

15. The method of claim 11, wherein shifting from the first mode to the second mode includes shifting from the serial mode to the split-path mode.

16. A method of operating an infinitely variable transmission (IVT) for transferring power from an engine and at least one infinitely variable power source (IVP) to an output shaft, the method comprising:
- operating the IVT in a serial mode in which a variator of the IVT receives engine power from the engine and IVP power from the at least one IVP, and the variator outputs recombined power from the at least one IVP;
- operating the IVT in a split-path mode in which the variator receives engine power from the engine and IVP power from the at least one IVP, and the variator outputs combined power from the at least one IVP and the engine;
- shifting from a first mode to a second mode of the plurality of transmission modes of the IVT;
- wherein shifting from the first mode to the second mode includes moving an engageable transmission member from a disengaged position to an engaged position;
- wherein the engageable transmission member includes a first component and a second component, the first and second components being rotatably engaged in the engaged position, the first and second components being disengaged in the disengaged position;
- wherein shifting from the first mode to the second mode includes rotating the first and second components at approximately the same angular speed as the engageable transmission member moves from the disengaged position to the engaged position; and
- wherein shifting from the first mode to the second mode includes shifting from a first split-path mode to a second split-path mode.

* * * * *